US009512247B2

(12) United States Patent
Ikari et al.

(10) Patent No.: US 9,512,247 B2
(45) Date of Patent: Dec. 6, 2016

(54) (METH)ACRYLOYL-TERMINATED POLYISOBUTYLENE POLYMER, METHOD FOR PRODUCING THE SAME, AND ACTIVE ENERGY RAY-CURABLE COMPOSITION

(71) Applicant: KANEKA CORPORATION, Osaka-shi, Osaka (JP)

(72) Inventors: Yoshihiro Ikari, Osaka (JP); Hironari Nakabayashi, Osaka (JP)

(73) Assignee: Kaneka Corporation, Osaka (JP)

( * ) Notice: Subject to any disclaimer, the term of this patent is extended or adjusted under 35 U.S.C. 154(b) by 131 days.

(21) Appl. No.: 14/346,547

(22) PCT Filed: Sep. 20, 2012

(86) PCT No.: PCT/JP2012/074030
§ 371 (c)(1),
(2) Date: Mar. 21, 2014

(87) PCT Pub. No.: WO2013/047314
PCT Pub. Date: Apr. 4, 2013

(65) Prior Publication Data
US 2014/0243444 A1    Aug. 28, 2014

(30) Foreign Application Priority Data

Sep. 27, 2011    (JP) ................. 2011-211334

(51) Int. Cl.
C08F 110/10    (2006.01)
C08F 8/26    (2006.01)
C08J 3/28    (2006.01)
C08F 10/08    (2006.01)
C08F 299/00    (2006.01)
C08F 8/14    (2006.01)
C08F 297/00    (2006.01)
C08F 8/00    (2006.01)

(52) U.S. Cl.
CPC ............. C08F 10/08 (2013.01); C08F 8/00 (2013.01); C08F 8/14 (2013.01); C08F 8/26 (2013.01); C08F 297/00 (2013.01); C08F 299/00 (2013.01); C08J 3/28 (2013.01); C08F 2810/30 (2013.01); C08F 2810/40 (2013.01); C08J 2323/22 (2013.01)

(58) Field of Classification Search
None
See application file for complete search history.

(56) References Cited

U.S. PATENT DOCUMENTS

| 3,428,615 | A |  | 2/1969 | Stuart et al. |  |
|---|---|---|---|---|---|
| 4,524,188 | A |  | 6/1985 | Kennedy et al. |  |
| 5,262,502 | A | * | 11/1993 | Fujisawa | C08F 210/10 526/185 |
| 5,290,873 | A | * | 3/1994 | Noda | C08F 10/10 525/244 |
| 5,665,823 | A | * | 9/1997 | Saxena | C08F 8/26 428/34 |
| 5,731,379 | A | * | 3/1998 | Kennan | C08F 290/068 524/806 |
| 8,569,420 | B2 | * | 10/2013 | Kennedy | C08F 10/10 525/244 |
| 2007/0043143 | A1 |  | 2/2007 | Sanai |  |
| 2011/0082259 | A1 | * | 4/2011 | Kennedy | C08F 10/10 525/244 |
| 2011/0213084 | A1 | * | 9/2011 | Kennedy | C08G 18/10 525/131 |
| 2013/0287980 | A1 | * | 10/2013 | Burdzy | C09J 4/06 428/35.7 |
| 2014/0243444 | A1 | * | 8/2014 | Ikari | C08F 299/00 522/28 |

FOREIGN PATENT DOCUMENTS

| CN | 1396902 | 2/2003 |  |
|---|---|---|---|
| CN | 1875041 | 12/2006 |  |
| EP | 0 353 471 | 2/1990 |  |
| EP | 0 832 960 | 4/1998 |  |
| EP | 1 251 118 | 10/2002 |  |
| JP | 64-11102 | 1/1989 |  |
| JP | 4-154815 | 5/1992 |  |
| JP | 4-183702 | 6/1992 |  |
| JP | H4-183702 A * | 6/1992 | ............... C08F 8/00 |
| JP | 5-186513 | 7/1993 |  |
| JP | 10-087726 | 4/1998 |  |
| JP | 10-139811 | 5/1998 |  |
| JP | 2001-031714 | 2/2001 |  |
| JP | 2001-055415 | 2/2001 |  |
| WO | 2010/083181 | 7/2010 |  |

OTHER PUBLICATIONS

Morgan, et al., "End-Quenching of TiCl4-Catalyzed Quasiliving Polyisobutylene with Alkoxybenzenes for Direct Chain End Functionalization", Macromolecules, vol. 43, No. 21, 2010, pp. 8724-8740.

* cited by examiner

Primary Examiner — Peter A Salamon
(74) Attorney, Agent, or Firm — Hamre, Schumann, Mueller & Larson, P.C.

(57) ABSTRACT

The purpose of the present invention is to provide a polymer having a low halogen atom content remaining in the polymer, a simple production method thereof, an active energy ray-curable composition that can be rapidly cured by an irradiation of a small amount of light, and a cured product thereof. These purpose can be achieved by an active energy ray-curable composition, including a polyisobutylene polymer (A) represented by the following general formula (1) (wherein $R^1$ represents a monovalent or polyvalent aromatic hydrocarbon group, or a monovalent or a polyvalent aliphatic hydrocarbon group; A represents a polyisobutylene polymer; $R^2$ represents a divalent saturated hydrocarbon group having 2-6 carbon atoms, which contains no hetero atoms; $R^3$ and $R^4$ each represent hydrogen, a monovalent hydrocarbon group having 1-20 carbon atoms, or an alkoxy group having 1-20 carbon atoms; $R^5$ represents hydrogen or a methyl group; and n denotes a natural number), and an active energy ray polymerization initiator (B).

6 Claims, No Drawings

(METH)ACRYLOYL-TERMINATED POLYISOBUTYLENE POLYMER, METHOD FOR PRODUCING THE SAME, AND ACTIVE ENERGY RAY-CURABLE COMPOSITION

TECHNICAL FIELD

The present invention relates to a polymer having a low halogen atom content remaining in the polymer, a simple production method thereof, an active energy ray-curable composition that can be rapidly cured by an irradiation of a small amount of light, and a cured product thereof.

BACKGROUND ART

Techniques for crosslinking resins with active energy rays such as UV (ultraviolet rays) or EB (electron beam) are widely known. Situations in which such techniques are utilized instead of conventional curing reactions triggered by heat have been increasing.

Active energy ray-curing techniques have improved productivity when compared to thermosetting techniques, due to requirement of less solvent, less energy, and less space in the curing process as well as an ability to complete the reaction in a short time in general. In addition, since light can be irradiated uniformly on a substrate having a complex shape, an active energy ray-curing technique has the benefit that it is easy to achieve higher functionality. These techniques are thus used in applications such as inks, paints, adhesives, sealing materials, electrical and electronic precision components, molded articles and the like.

Some of the major characteristics required for resins in the above-described fields include durability, heat resistance, weatherability, water resistance, permeability of moisture and gas, and the like. An example of a resin which has a combination of such characteristics is a polyisobutylene polymer.

The (meth)acryloyl-terminated polyisobutylene described in Patent Literature 1 is known as a resin having a photo-crosslinkable group on a polyisobutylene end. In the technique disclosed in Patent Literature 1, the synthesis pathway of the (meth)acryloyl-terminated polyisobutylene is an extremely long linear synthesis method, and the chlorine atoms that inherently remain in the obtained resin may be undesirable depending on the application.

Patent Literature 2 discloses a technique relating to a (meth)acryloyl-terminated polyisobutylene polymer that essentially does not contain halogen atoms. However, the disclosed synthesis method is complex, and the silane compound and platinum catalyst required for synthesis are very expensive. Therefore, there were large economic limitations to industrial production. Further, this method requires an irradiation of light in an amount of as large as 2,000 J to cure the obtained curable composition. Accordingly, there is a need for a polymer that can be synthesized more simply and that can be cured by an irradiation of a small amount of light.

Patent Literature 3 discloses a technique that functionalizes a polyisobutylene terminal with a phenoxy derivative. However, there are no specific examples showing the presence of the polymer with unhydrolyzed terminals under a condition wherein a compound having a phenoxy group and a (meth)acryloyl ester group is used as an end cap agent and a Lewis acid coexists during a reaction and a post-treatment. Moreover, it is unclear whether the obtained polymer is actually cured with active energy rays, and further, the activity of this polymer is also unclear.

Patent Literature 4 discloses a technique that introduces an alkenyl group onto an isobutylene polymer end by a Friedel-Crafts reaction. Patent Literature 4 only describes that this alkenyl-terminated polyisobutylene polymer can be cured by forming a bond by a hydrosilylation reaction with a hydrosilane compound in the presence of a platinum catalyst.

CITATION LIST

Patent Literature

Patent Literature 1: JP 2001-31714 A
Patent Literature 2: JP 10-87726 A
Patent Literature 3: WO 2010/083181
Patent Literature 4: JP 05-186513 A

SUMMARY OF INVENTION

Technical Problem

It is an object of the present invention, which was created in consideration of the above-described problems, to provide a polymer having a low halogen atom content remaining in the polymer, a simple production method thereof, an active energy ray-curable composition that can be rapidly cured by an irradiation of a small amount of light, and a cured product thereof.

Solution to Problem

As a result of diligent research into achieving the above object, the present inventors found that the above-described problems can be solved by combining a (meth)acryloyl-terminated polyisobutylene polymer represented by the following general formula (1), a (meth)acryloyl-terminated polyisobutylene polymer, and an active energy ray polymerization initiator, thereby completing the present invention.

Namely, the present invention relates to an active energy ray-curable composition comprising: a (meth)acryloyl-terminated polyisobutylene polymer (A) represented by the following general formula (1):

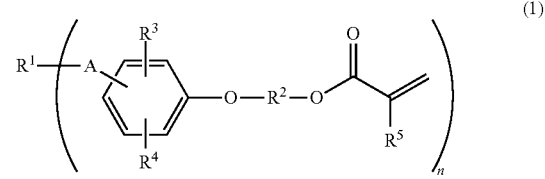

wherein $R^1$ represents a monovalent or polyvalent aromatic hydrocarbon group, or a monovalent or a polyvalent aliphatic hydrocarbon group; A represents a polyisobutylene polymer; $R^2$ represents a divalent saturated hydrocarbon group having 2 to 6 carbon atoms, which contains no hetero atoms; $R^3$ and $R^4$ each represent hydrogen, a monovalent hydrocarbon group having 1 to 20 carbon atoms, or an alkoxy group having 1 to 20 carbon atoms; $R^5$ represents hydrogen or a methyl group; and n denotes a natural number; and an active energy ray polymerization initiator (B).

It is preferable that a main chain of the polyisobutylene polymer represented by A be produced by living cationic polymerization.

It is preferable that the (meth)acryloyl-terminated polyisobutylene polymer (A) have a molecular weight of 200 to 500,000 in terms of number average molecular weight based on polystyrene measured by size exclusion chromatography, and a molecular weight distribution of 1.8 or less.

It is preferable that a content of the active energy ray polymerization initiator (B) be 0.001 to 20 parts by weight per 100 parts by weight of the (meth)acryloyl-terminated polyisobutylene polymer (A).

The present invention also relates to a cured product obtainable by curing the above-described active energy ray-curable composition with active energy rays.

The present invention also relates to a (meth)acryloyl-terminated polyisobutylene polymer (A) represented by the following general formula (1):

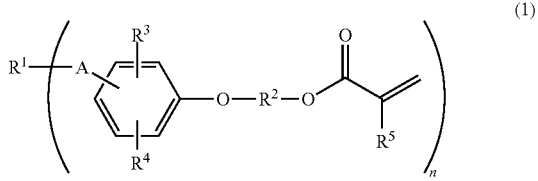

wherein $R^1$ represents a monovalent or polyvalent aromatic hydrocarbon group, or a monovalent or a polyvalent aliphatic hydrocarbon group; A represents a polyisobutylene polymer; $R^2$ represents a divalent saturated hydrocarbon group having 2 to 6 carbon atoms, which contains no hetero atoms; $R^3$ and $R^4$ each represent hydrogen, a monovalent hydrocarbon group having 1 to 20 carbon atoms, or an alkoxy group having 1 to 20 carbon atoms; $R^5$ represents hydrogen or a methyl group; and n denotes a natural number.

It is preferable that $R^2$ represent a divalent hydrocarbon group selected from the group consisting of —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, and —CH$_2$CH$_2$CH$_2$CH$_2$CH$_2$CH$_2$—. It is more preferable that $R^2$ represent —CH$_2$CH$_2$—.

It is preferable that $R^3$ and $R^4$ represent hydrogen.

It is preferable that $R^5$ represent hydrogen.

It is preferable that the (meth)acryloyl-terminated polyisobutylene polymer (A) have a molecular weight of 200 to 500,000 in terms of number average molecular weight based on polystyrene measured by size exclusion chromatography (SEC), and a molecular weight distribution (a value represented by Mw/Mn which is a ratio of the weight average molecular weight Mw to the number average molecular weight Mn) of 1.8 or less.

The present invention also relates to a method for producing a (meth)acryloyl-terminated polyisobutylene polymer (A) represented by the following general formula (1):

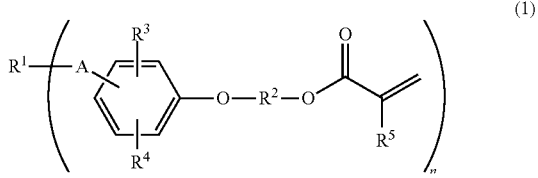

wherein $R^1$ represents a monovalent or polyvalent aromatic hydrocarbon group, or a monovalent or a polyvalent aliphatic hydrocarbon group; A represents a polyisobutylene polymer; $R^2$ represents a divalent saturated hydrocarbon group having 2 to 6 carbon atoms, which contains no hetero atoms; $R^3$ and $R^4$ each represent hydrogen, a monovalent hydrocarbon group having 1 to 20 carbon atoms, or an alkoxy group having 1 to 20 carbon atoms; $R^5$ represents hydrogen or a methyl group; and n denotes a natural number, comprising reacting a halogen-terminated polyisobutylene polymer (a1) obtainable by cationic polymerization and a compound (a2) having a (meth)acryloyl group and a phenoxy group in the presence of a Lewis acid catalyst.

It is preferable that the cationic polymerization be living cationic polymerization.

It is preferable that the compound (a2) having a (meth)acryloyl group and a phenoxy group be 2-phenoxyethyl acrylate.

It is preferable that the halogen-terminated polyisobutylene polymer (a1) and the compound (a2) having a (meth)acryloyl group and a phenoxy group be reacted under a temperature condition of less than 0° C.

It is preferable that the halogen-terminated polyisobutylene polymer (a1) and the compound (a2) having a (meth)acryloyl group and a phenoxy group be reacted under a reaction condition in which a molar ratio of the compound (a2) having a (meth)acryloyl group and a phenoxy group to the Lewis acid (a value represented by (number of moles of compound (a2) having a (meth)acryloyl group and a phenoxy group)/(number of moles of Lewis acid)) is less than 1.0.

Advantageous Effects of Invention

According to the (meth)acryloyl-terminated polyisobutylene polymer according to the present invention, a polymer having a very low halogen atom content remaining in the polymer can be produced more simply than a conventional production method. Further, a composition including such a polymer can be rapidly cured by an irradiation of a small amount of light.

DESCRIPTION OF EMBODIMENTS

The polyisobutylene polymer (A) according to the present invention is represented by the following general formula (1):

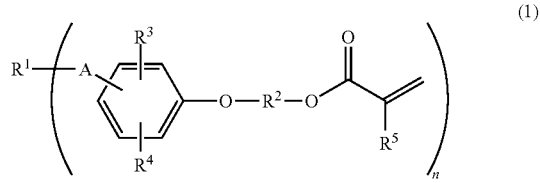

wherein $R^1$ represents a monovalent or polyvalent aromatic hydrocarbon group, or a monovalent or a polyvalent aliphatic hydrocarbon group; A represents a polyisobutylene polymer; $R^2$ represents a divalent saturated hydrocarbon group having 2 to 6 carbon atoms, which contains no hetero atoms; $R^3$ and $R^4$ each represent hydrogen, a monovalent hydrocarbon group having 1 to 20 carbon atoms, or an alkoxy group having 1 to 20 carbon atoms; $R^5$ represents hydrogen or a methyl group; and n denotes a natural number.

The moiety A in the (meth)acryloyl-terminated polyisobutylene polymer (A) according to the present invention is a polyisobutylene polymer. However, in addition to isobutylene mainly used as the monomer forming this polyisobutylene polymer, other cationically polymerizable monomers may also be copolymerized as long as the effects of the present invention are not impaired.

Examples of such a monomer include olefins having 4 to 12 carbon atoms, vinyl ethers, aromatic vinyl compounds, vinyl silanes, allylsilanes and the like. Specific examples thereof include isoprene, amylene, 1,3-butadiene, 1-butene, 2-butene, 2-methyl-1-butene, 3-methyl-1-butene, pentene, 4-methyl-1-pentene, hexene, vinyl cyclohexene, α-pinene, β-pinene, limonene, styrene, indene, α-methylstyrene, methoxystyrene, methylstyrene, trimethylstyrene, chlorostyrene, dichlorostyrene, methyl vinyl ether, ethyl vinyl ether, isobutyl vinyl ether, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane and the like.

When using another monomer that is copolymerizable with isobutylene, the content of that monomer in the isobutylene polymer is preferably in the range of 50% by weight or less, more preferably 30% by weight or less, and even more preferably 10% by weight or less.

$R^1$ in the above general formula (1) represents a monovalent or polyvalent aromatic hydrocarbon group, or a monovalent or a polyvalent aliphatic hydrocarbon group. Specific examples of the aromatic hydrocarbon group include a cumyl group, an m-dicumyl group, a p-dicumyl group, a 5-tert-butyl-1,3-dicumyl group, a 5-methyl-1,3-dicumyl group, a 1,3,5-tricumyl group and the like. On the other hand, specifically preferred examples of the aliphatic hydrocarbon group include a group represented by $CH_3$ $(CH_3)_2CCH_2$ $(CH_3)_2C$— and —$(CH_3)_2CCH_2$ $(CH_3)_2CCH_2$ $(CH_3)_2C$—. Among these, from the perspective of availability, a cumyl group, an m-dicumyl group, a p-dicumyl group, a 5-tert-butyl-1,3-dicumyl group, $CH_3(CH_3)_2CCH_2(CH_3)_2C$—, and —$(CH_3)_2CCH_2(CH_3)_2CCH_2(CH_3)_2C$— are especially preferable.

$R^2$ in the above general formula (1) represents a divalent saturated hydrocarbon group having 2 to 6 carbon atoms, which contains no hetero atoms. Specifically preferred examples thereof include —$CH_2CH_2$—, —$CH_2CH_2CH_2$—, —$CH_2CH_2CH_2CH_2$—, —$CH_2CH_2CH_2CH_2CH_2$—, —$CH_2CH_2CH_2CH_2CH_2CH_2$— and the like. Among these, from the perspective of availability, —$CH_2CH_2$— is preferable.

$R^3$ and $R^4$ in the above general formula (1) each represent hydrogen, a monovalent hydrocarbon group having 1 to 20 carbon atoms, or an alkoxy group having 1 to 20 carbon atoms. Specific examples thereof include a methyl group, an ethyl group, a propyl group, an isopropyl group, a butyl group, a sec-butyl group, a tert-butyl group, a pentyl group, an isopentyl group, a neopentyl group, a hexyl group, an isohexyl group, a neohexyl group, a heptyl group, an octyl group, an isooctyl group, a sec-octyl group, a tert-octyl group, a 2-ethylhexyl group, a nonyl group, a decanyl group, a methoxy group, an ethoxy group, a propoxy group, an isopropoxy group, a butoxy group, a sec-butoxy group, a tert-butoxy group, a pentyloxy group, an isopentyloxy group, a neopentyloxy group, a hexyloxy group, an isohexyloxy group, a neohexyloxy group, a heptyloxy group, an octyloxy group, an isooctyloxy group, a sec-octyloxy group, a tert-octyloxy group, a 2-ethylhexyloxy group, a nonyloxy group, a decanyloxy group and the like.

Among these, from the perspectives of availability and reactivity, hydrogen is preferable.

$R^5$ in the above general formula (1) represents hydrogen or a methyl group. From the perspectives of availability and reactivity, hydrogen is preferable.

In the above general formula (1), n denotes a natural number. In order to achieve a sufficient strength, durability, gel fraction and the like when obtaining a crosslinkable macromolecule by a crosslinking reaction, n is preferably 2 or 3.

The molecular weight of the (meth)acryloyl-terminated polyisobutylene polymer (A) according to the present invention is not especially limited. However, from perspectives such as fluidity, and post-curing physical properties, the number average molecular weight based on a SEC (size exclusion chromatography) measurement is preferably 200 to 500,000, more preferably 300 to 500,000, and even more preferably 1,000 to 500,000.

If the number average molecular weight of the (meth)acryloyl-terminated polyisobutylene polymer (A) is lower than 200, the degree of curability of the active energy ray-curable composition is too high, which is not desirable. On the other hand, if the number average molecular weight is more than 500,000, fluidity and workability tend to deteriorate.

In addition, from the perspective of processing stability, the molecular weight distribution (a value represented by (weight average molecular weight Mw)/(number average molecular weight Mn)) of the (meth)acryloyl-terminated polyisobutylene polymer (A) is preferably 1.8 or less, more preferably 1.5 or less, and even more preferably 1.3 or less.

It is preferable that the (meth)acryloyl-terminated polyisobutylene polymer (A) represented by general formula (1) according to the present invention be obtained in one stage by a reaction between a halogen-terminated polyisobutylene polymer (a1) and a compound (a2) having a (meth)acryloyl group and a phenoxy group.

It is preferable that the halogen-terminated polyisobutylene polymer (a1) be represented by the following general formula (I):

$$R^1(\text{-A-X})_n \qquad (I)$$

wherein X represents a halogen atom and $R^1$ and n are the same as described above.

X in the above general formula (I) represents chlorine, bromine, or iodine. From the perspectives of availability and compound stability, chlorine is preferable.

The method for producing the halogen-terminated polyisobutylene polymer (a1) is preferably cationic polymerization, and more preferably living cationic polymerization.

Details of the living cationic polymerization that can be applied in the present invention can be found in, for example, the descriptions about synthesis reactions in a book by J. P. Kennedy et al. (Carbocationic Polymerization, John Wiley & Sons, 1982) and in a book by K. Matyjaszewski et al. (Cationic Polymerizations, Marcel Dekker, 1996).

Specifically, the halogen-terminated polyisobutylene polymer (a1) can be obtained by polymerizing a monomer component that mainly includes isobutylene in the presence of a compound represented by the following general formula (II), which is a polymerization initiator:

$$R^1Xn \qquad (II)$$

wherein X and n are the same as described above.

It is thought that the compound represented by the above general formula (II) acts as a polymerization initiator, and that carbocations are produced in the presence of a Lewis acid and the like, which serve as a starting point for cationic polymerization.

Examples of the compound of general formula (II) used in the present invention include the following compounds:

(1-chloro-1-methylethyl)benzene [$C_6H_5C(CH_3)_2Cl$]; 1,4-bis(1-chloro-1-methylethyl)benzene [$1,4-Cl(CH_3)_2CC_6H_4C(CH_3)_2Cl$]; 1,3-bis(1-chloro-1-methylethyl)benzene [$1,3-Cl(CH_3)_2CC_6H_4C(CH_3)_2Cl$]; 1,3,5-tris(1-chloro-1-methylethyl)benzene [$1,3,5-(ClC(CH_3)_2)_3C_6H_3$]; and 1,3-bis(1-chloro-1-methylethyl)-5-(tert-butyl)benzene [$1,3-(C(CH_3)_2Cl)_2-5-(C(CH_3)_3)C_6H_3$].

Among these, 1,4-bis(1-chloro-1-methylethyl)benzene and 1,3,5-tris(1-chloro-1-methylethyl)benzene are especially preferable.

(1-Chloro-1-methylethyl)benzene is also called cumyl chloride. Bis(1-chloro-1-methylethyl)benzene is also called bis(α-chloroisopropyl)benzene, bis(2-chloro-2-propyl)benzene, or dicumyl chloride. Tris(1-chloro-1-methylethyl)benzene is also called tris(α-chloroisopropyl)benzene, tris(2-chloro-2-propyl)benzene, or tricumyl chloride.

When producing the halogen-terminated polyisobutylene polymer (a1), it is preferable that a Lewis acid catalyst coexist. Such a Lewis acid may be any Lewis acid that can be used in cationic polymerization. Examples of acids that can be preferably used include metallic halides such as $TiCl_4$, $TiBr_4$, $BCl_3$, $BF_3$, $BF_3.OEt_2$, $SnCl_4$, $SnBr_4$, $SbCl_5$, $SbBr_5$, $SbF_5$, $WCl_6$, $TaCl_5$, $VCl_5$, $FeCl_3$, $FeBr_3$, $ZnCl_2$, $ZnBr_2$, $AlCl_3$, and $AlBr_3$; and organometallic halides such as $Et_2AlCl$, $Me_2AlCl$, $EtAlCl_2$, $MeAlCl_2$, $Et_2AlBr$, $Me_2AlBr$, $EtAlBr_2$, $MeAlBr_2$, $Et_{1.5}AlCl_{1.5}$, $Me_{1.5}AlCl_{1.5}$, $Et_{1.5}AlBr_{1.5}$, and $Me_{1.5}AlBr_{1.5}$. Among these, when considering catalytic capability and ease of industrial availability, $TiCl_4$, $BCl_3$, and $SnCl_4$ are preferable, and in terms of a balance between catalytic activity and availability, $TiCl_4$ is especially preferable in the present invention.

The amount of use of the Lewis acid is not especially limited, and can be set based on the polymerization properties of the monomers to be used, the polymerization concentration or the like. Usually, the Lewis acid can be used in an amount in the range of 0.01 to 300 molar equivalents relative to the compound represented by general formula (II), and preferably in the range of 0.05 to 200 molar equivalents.

During production of the halogen-terminated polyisobutylene polymer (a1), an electron donor component can optionally also be made present. It is thought that this electron donor component has the effect of stabilizing the growing carbocation during cationic polymerization. Addition of an electron donor allows production of a polymer having a narrower molecular weight distribution and a controlled structure. Although compounds that can be used as the electron donor component are not especially limited, examples thereof include pyridines, amines, amides, sulfoxides, esters, metal compounds having an oxygen atom bonded to a metal atom or the like.

Specific examples of the above-described electron donor component which can be used may typically include, as compounds having a donor number defined as a parameter representing the strength as an electron donor for various compounds of 15 to 60, 2,6-di-t-butylpyridine, 2-t-butylpyridine, 2,4,6-trimethylpyridine, 2,6-dimethylpyridine, 2-methylpyridine, pyridine, diethylamine, trimethylamine, triethylamine, tributylamine, N,N-dimethylaniline, N,N-dimethylformamide, N,N-dimethylacetamide, N,N-diethylacetamide, dimethyl sulfoxide, diethyl ether, methyl acetate, ethyl acetate, trimethyl phosphate, hexamethylphosphoric triamide, titanium alkoxides such as titanium(III) methoxide, titanium(IV) methoxide, titanium(IV) isopropoxide and titanium(IV) butoxide; and aluminum alkoxides such as aluminum triethoxide and aluminum tributoxide. Preferable examples include 2,6-di-t-butylpyridine, 2,6-dimethylpyridine, 2-methylpyridine, pyridine, diethylamine, trimethylamine, triethylamine, N,N-dimethylformamide, N,N-dimethylacetamide, dimethyl sulfoxide, titanium(IV) isopropoxide, titanium(IV) butoxide and the like. The donor number of the various substances described above is illustrated in "The Donor-Acceptor Approach to Molecular Interactions", Gutmann, translated by Otaki and Okada, Gakkai Shuppan Center (1983). Among these substances, 2-methylpyridine, which has a notable addition effect, is especially preferable.

The above-described electron donor component is used, usually, in an amount that is 0.01 to 50 times, and preferably in the range of 0.1 to 30 times, the number of moles of the above-described polymerization initiator.

Polymerization of the halogen-terminated polyisobutylene polymer (a1) can be carried out in an organic solvent if necessary. This organic solvent is not especially limited, as long as it does not substantially inhibit the cationic polymerization. Specific examples thereof include halogenated hydrocarbons such as methyl chloride, dichloromethane, chloroform, ethyl chloride, dichloroethane, n-propyl chloride, n-butyl chloride, and chlorobenzene; alkylbenzenes such as benzene, toluene, xylene, ethylbenzene, propylbenzene, and butylbenzene; straight-chain aliphatic hydrocarbons such as ethane, propane, butane, pentane, hexane, heptane, octane, nonane, and decane; branched-chain aliphatic hydrocarbons such as 2-methylpropane, 2-methylbutane, 2,3,3-trimethylpentane, and 2,2,5-trimethylhexane; alicyclic hydrocarbons such as cyclohexane, methylcyclohexane, and ethylcyclohexane; paraffin oil produced by hydrogenating and refining petroleum fractions and the like.

In consideration of the balance between, for example, the polymerization properties of the monomers forming the isobutylene polymer and the solubility of the produced polymer, these solvents can be used alone or in combination of two or more thereof. The amount of the solvent to be used is determined so that the concentration of the polymer is 1 to 50% by weight, and preferably 5 to 35% by weight, in consideration of the viscosity of the obtained polymer solution and how easily heat is removed.

During the actual polymerization, the respective components are mixed under cooling, for example, at a temperature of at least −100° C. and less than 0° C. From the viewpoint of balance between energy costs with polymerization stability, an especially preferable temperature range is −30° C. to −80° C.

The compound (a2) having a (meth)acryloyl group and a phenoxy group is preferably represented by general formula (2):

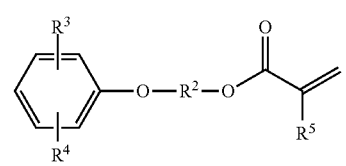

wherein $R^2$, $R^3$, $R^4$, and $R^5$ are the same as above.

Specific examples thereof may include 2-phenoxyethyl acrylate, 3-phenoxypropyl acrylate, 4-phenoxybutyl acrylate, 5-phenoxypentyl acrylate, 6-phenoxyhexyl acrylate, 2-phenoxyethyl methacrylate, 3-phenoxypropyl methacrylate, 4-phenoxybutyl methacrylate, 5-phenoxypentyl methacrylate, 6-phenoxyhexyl methacrylate, 2-(2-methylphenoxy)ethyl acrylate, 3-(2-methylphenoxy)propyl acrylate, 4-(2-methylphenoxy)butyl acrylate, 5-(2-methylphenoxy)pentyl acrylate, 6-(2-methylphenoxy)hexyl acrylate, 2-(2-methylphenoxy)ethyl methacrylate, 3-(2-methylphenoxy)propyl methacrylate, 4-(2-methylphenoxy)butyl methacrylate, 5-(2-methylphenoxy)pentyl methacrylate, 6-(2-methylphenoxy)hexyl methacrylate, 2-(2,6-dimethylphenoxy)ethyl acrylate, 3-(2,6-dimethylphenoxy)propyl acrylate, 4-(2,6-dimethylphenoxy)butyl acrylate, 5-(2,6-dimethylphenoxy)pentyl acrylate, 6-(2,6-dimethylphenoxy)hexyl acrylate, 2-(2,6-dimethylphenoxy)ethyl methacrylate, 3-(2,6-dimethylphenoxy)propyl methacrylate, 4-(2,6-dimethylphenoxy)butyl methacrylate, 5-(2,6-dimethylphenoxy)pentyl methacrylate, 6-(2,6-dimethylphenoxy)hexyl methacrylate, 2-(2-methoxyphenoxy)ethyl acrylate, 3-(2-methoxyphenoxy)propyl acrylate, 4-(2-methoxyphenoxy)butyl acrylate, 5-(2-methoxyphenoxy)pentyl acrylate, 6-(2-methoxyphenoxy)hexyl acrylate, 2-(2-methoxyphenoxy)ethyl methacrylate, 3-(2-methoxyphenoxy)propyl methacrylate, 4-(2-methoxyphenoxy)butyl methacrylate, 5-(2-methoxyphenoxy)pentyl methacrylate, 6-(2-methoxyphenoxy)hexyl methacrylate, 2-(2,6-dimethoxyphenoxy)ethyl acrylate, 3-(2,6-dimethoxyphenoxy)propyl acrylate, 4-(2,6-dimethoxyphenoxy)butyl acrylate, 5-(2,6-dimethoxyphenoxy)pentyl acrylate, 6-(2,6-dimethoxyphenoxy)hexyl acrylate, 2-(2,6-dimethoxyphenoxy)ethyl methacrylate, 3-(2,6-dimethoxyphenoxy)propyl methacrylate, 4-(2,6-dimethoxyphenoxy)butyl methacrylate, 5-(2,6-dimethoxyphenoxy)pentyl methacrylate, 6-(2,6-dimethoxyphenoxy)hexyl methacrylate. From the perspectives of availability, reactivity in the Friedel-Crafts reaction, and the reactivity of the acryloyl group, 2-phenoxyethyl acrylate is preferable.

When reacting the compound (a2) having a (meth)acryloyl group and a phenoxy group that is represented by the above general formula (2) with the halogen-terminated polyisobutylene polymer (a1) obtainable by cationic polymerization that is represented by the above general formula (I), it is preferable to use a Lewis acid as a catalyst.

In this case, although the Lewis acid is not especially limited as long as it is a common Lewis acid, Lewis acids such as $TiCl_4$, $Ti(OiPr)_4$, $TiBr_4$, $AlCl_3$, $AlBr_3$, $Et_2AlCl$, $Me_2AlCl$, $EtAlCl_2$, $MeAlCl_2$, $Et_2AlBr$, $Me_2AlBr$, $EtAlBr_2$, $MeAlBr_2$, $Et_{1.5}AlCl_{1.5}$, $Me_{1.5}AlCl_{1.5}$, $Et_{1.5}AlBr_{1.5}$, $Me_{1.5}AlBr_{1.5}$, $BCl_3$, $BF_3$, $BF_3(OEt_2)$, $GaCl_3$, $FeCl_3$, $FeBr_3$, $SnCl_4$, $SnBr_4$, $SbCl_5$, $SbBr_5$, $SbF_5$, $WCl_6$, $TaCl_5$, $VCl_5$, $ZnCl_2$, and $ZnBr_2$ are preferable because these acids have especially high reactivity and excellent selectivity.

From the perspectives of industrial availability and reactivity, $TiCl_4$, $Ti(OiPr)_4$, $TiBr_4$, $AlCl_3$, $AlBr_3$, $Et_2AlCl$, $Me_2AlCl$, $EtAlCl_2$, $MeAlCl_2$, $Et_2AlBr$, $Me_2AlBr$, $EtAlBr_2$, $MeAlBr_2$, $Et_{1.5}AlCl_{1.5}$, $Me_{1.5}AlCl_{1.5}$, $Et_{1.5}AlBr_{1.5}$, $Me_{1.5}AlBr_{1.5}$, $BCl_3$, $BF_3$, $BF_3(OEt_2)$, $GaCl_3$, $FeCl_3$, $FeBr_3$, $SnCl_4$, $ZnCl_2$, and $ZnBr_2$ Are especially preferable.

It is preferable to perform the reaction under conditions in which the molar ratio of the compound (a2) having a (meth)acryloyl group and a phenoxy group to the Lewis acid (a value represented by (number of moles of compound (a2) having a (meth)acryloyl group and a phenoxy group)/(number of moles of Lewis acid)) is less than 1.0. If this ratio is 1.0 or more, the reactivity of the addition reaction of compound (a2) having a (meth)acryloyl group and a phenoxy group with the halogen-terminated polyisobutylene polymer (a1) deteriorates, and the introduction ratio of (meth)acryloyl groups decreases, which are not desirable. This is thought to be due to the coordination of the compound (a2) having a (meth)acryloyl group and a phenoxy group to the Lewis acid, which causes Lewis acidity to deteriorate.

When reacting the compound (a2) having a (meth)acryloyl group and a phenoxy group with the halogen-terminated polyisobutylene polymer (a1) obtainable by cationic polymerization, these components may be reacted in the absence of a solvent in the case where the mixture including the halogen-terminated polyisobutylene polymer (a1) and the compound (a2) having a (meth)acryloyl group and a phenoxy group has a low viscosity and can be stirred so that the reaction can be carried out with the mixture only.

On the other hand, when using a reaction solvent, for example, a solvent arbitrarily selected from among halogenated hydrocarbons, aromatic hydrocarbons, and aliphatic hydrocarbons may be used alone or as a mixed solvent. Regarding the selection of these solvents, from the perspectives of solubility and reactivity under the polymerization conditions, as a halogenated hydrocarbon, it is preferable to select one or more components selected from methylene chloride, chloroform, 1,1-dichloroethane, 1,2-dichloroethane, n-propyl chloride, and n-butyl chloride. For the same reasons, toluene is preferable as an aromatic hydrocarbon, and one or more components selected from butane, pentane, hexane, heptane, octane, nonane, decane, cyclohexane, methyl cyclohexane, and ethyl cyclohexane are preferable as an aliphatic hydrocarbon.

Examples of solvents used in reactions which do not use halogenated hydrocarbons, which may give negative impact on the environment, include toluene, ethyl cyclohexane, or a mixed solvent of these. By using such solvents, production of the (meth)acryloyl group-terminated polyisobutylene polymer represented by general formula (1) can be easily achieved.

The reaction temperature in the reaction between the halogen-terminated polyisobutylene polymer (a1) and the compound (a2) having a (meth)acryloyl group and a phenoxy group represented by the above general formula (2) is preferably a temperature lower than 0° C. If the reaction is carried out at 0° C. or higher, the introduction ratio of the compound (a2) having a (meth)acryloyl group and a phenoxy group may decrease, which is not desirable. The decrease of the introduction ratio occurs because the halogen-terminated polyisobutylene undergoes a chain transfer reaction, so that exo-olefins (isopropenyl groups), inactive in the Friedel-Crafts reaction, are produced as the terminal functional groups of the polyisobutylene.

When reacting the halogen-terminated polyisobutylene polymer (a1) and the compound (a2) having a (meth)acryloyl group and a phenoxy group represented by the above general formula (2), an isolated halogen-terminated polyisobutylene polymer (a1) may be reacted with the compound (a2) having a (meth)acryloyl group and a phenoxy group, or the reaction may be carried out by adding the compound (a2) having a (meth)acryloyl group and a phenoxy group into the polymerization system during the synthesis of the halogen-terminated polyisobutylene polymer (a1).

In the latter case, the timing for adding the compound (a2) having a (meth)acryloyl group and a phenoxy group is preferably at a point when the conversion rate of the isobutylene monomer measured by gas chromatography has reached 50% or more, more preferably 80% or more, and even more preferably 95% or more.

In the present invention, as the compound (a2) having a (meth)acryloyl group and a phenoxy group represented by the above general formula (2), a commercially-available compound can be used as it is, or a compound individually synthesized depending on the intended purpose may be used.

In the latter case, the compound can be simply synthesized by reacting an alcohol compound (a3) represented by the following general formula (3):

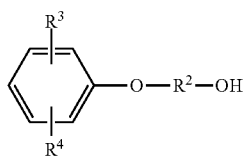

(3)

wherein $R^2$, $R^3$, and $R^4$ are the same as described above;
with a compound represented by the following general formula (4):

wherein $R^5$ and X are the same as described above.

When reacting the alcohol compound (a3) and the compound represented by general formula (4), in order to accelerate the reaction, a base that captures the produced HX, namely, hydrogen chloride, hydrogen bromide, or hydrogen iodide, may also be added. Examples of the added base include amine compounds such as ammonia, diethylamine, triethylamine, di-n-propylamine, tri-n-propylamine, di-1-propylamine, tri-1-propylamine, di-n-butylamine, tri-n-butylamine, di-1-butylamine and tri-1-butylamine, nitrogen-containing compounds such as pyridine, α-picoline, β-picoline, aniline, methylaniline, dimethylaniline and N,N-dimethylaniline, lithium hydroxide, sodium hydroxide, potassium hydroxide, rubidium hydroxide, cesium hydroxide, lithium carbonate, sodium carbonate, potassium carbonate, rubidium carbonate, cesium carbonate, lithium bicarbonate, sodium bicarbonate, potassium bicarbonate, rubidium hydrogen carbonate, cesium hydrogen carbonate, lithium hydride, sodium hydride, butyl lithium, lithium diisopropylamide and the like.

When reacting the alcohol compound (a3) and the compound represented by general formula (4), either a solvent system or a solvent-free system may be used. If a solvent is used, it is preferable that the solvent be a dehydrated solvent.

When using a solvent, examples of solvents that can be used include halogenated hydrocarbon solvents such as methylene chloride, chloroform, 1,1-dichloroethane, 1,2-dichloroethane, n-propyl chloride and n-butyl chloride; aromatic hydrocarbon solvents such as benzene, toluene and xylene; aliphatic hydrocarbon solvents such as pentane, n-hexane, cyclohexane, methyl cyclohexane and ethyl cyclohexane; ethers such as diethyl ether, dibutyl ether, diisopropyl ether, tetrahydrofuran, dimethoxyethane and dioxane; esters such as ethyl acetate; as well as acetonitrile, pyridine, triethylamine and the like.

The compound (a2) having a (meth)acrylic group and a phenoxy group can be obtained by reacting the alcohol compound (a3) and the compound represented by general formula (4) for 1 minute to 24 hours at a reaction temperature of −70° C. to 200° C., and preferably 0° C. to 100° C.

Another simple method for synthesizing the compound (a2) having a (meth)acryloyl group and a phenoxy group is a reaction of a compound (a4) having a phenoxy group and a halogen group that is represented by general formula (5):

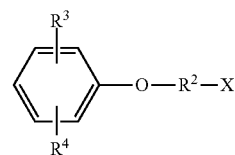

(5)

wherein $R^2$, $R^3$, $R^4$, and X are the same as described above;
with a compound represented by general formula (6):

(6)

wherein $R^5$ is the same as described above.

When reacting the compound (a4) having a phenoxy group and a halogen group and the compound represented by general formula (6), in order to accelerate the reaction, a base that captures the produced HX, namely, hydrogen chloride, hydrogen bromide, or hydrogen iodide, may also be added. Examples of the added base include nitrogen-containing compounds such as ammonia, diethylamine, triethylamine, di-n-propylamine, tri-n-propylamine, di-1-propylamine, tri-1-propylamine, di-n-butylamine, tri-n-butylamine, di-1-butylamine, tri-1-butylamine, pyridine, α-picoline, β-picoline, aniline, methylaniline, dimethylaniline and N,N-dimethylaniline, lithium hydroxide, sodium hydroxide, potassium hydroxide, rubidium hydroxide, cesium hydroxide, lithium carbonate, sodium carbonate, potassium carbonate, rubidium carbonate, cesium carbonate, lithium bicarbonate, sodium bicarbonate, potassium bicarbonate, rubidium hydrogen carbonate, cesium hydrogen carbonate, lithium hydride, sodium hydride, potassium hydride, butyl lithium, lithium diisopropylamide and the like.

Further, the compound represented by general formula (6) may be reacted in advance with the above-described base and thus neutralized, and the resultant compound may be reacted with the compound (a4) having a phenoxy group and a halogen group.

When reacting the compound (a4) having a phenoxy group and a halogen group and the compound represented by general formula (6), either a solvent system or a solvent-free system may be used. If a solvent is used, it is preferable that the solvent be a dehydrated solvent.

When using a solvent, examples of solvents that can be used include halogenated hydrocarbon solvents such as methylene chloride, chloroform, 1,1-dichloroethane, 1,2-dichloroethane, n-propyl chloride and n-butyl chloride; aromatic hydrocarbon solvents such as benzene, toluene and xylene; aliphatic hydrocarbon solvents such as pentane, n-hexane, cyclohexane, methyl cyclohexane and ethyl cyclohexane; ethers such as diethyl ether, dibutyl ether, diisopropyl ether, tetrahydrofuran, dimethoxyethane and dioxane; esters such as ethyl acetate; as well as acetonitrile, pyridine, triethylamine and the like.

the compound (a2) having a (meth)acryloyl group and a phenoxy group can be obtained by reacting the compound (a4) having a phenoxy group and a halogen group and the compound represented by general formula (6) for 1 minute to 24 hours at a reaction temperature of −70° C. to 200° C., and preferably 0° C. to 100° C.

Further, the (meth)acryloyl-terminated polyisobutylene polymer (A) represented by general formula (1) according to the present invention can also be obtained by a method in which the halogen-terminated polyisobutylene polymer (a1) is reacted with a compound (a5) having a phenoxy group, and then reacted with a compound (a6) having a (meth)acryloyl group.

Specifically, the (meth)acryloyl-terminated polyisobutylene polymer (A) can also be synthesized by reacting a polyisobutylene polymer (a7) having a hydroxyl group on an end represented by the following general formula (7):

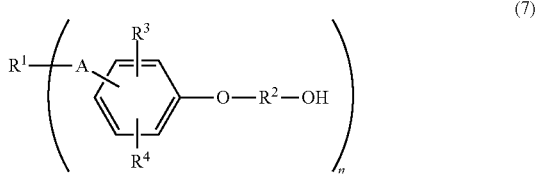

wherein A, $R^1$, $R^2$, $R^3$, $R^4$, and n are the same as described above;

with a compound represented by the above-described general formula (4):

$$XC(O)C(R^5)=CH_2 \quad (4)$$

wherein $R^5$ and X are the same as described above. In this case too, the (meth)acryloyl-terminated polyisobutylene polymer (A) can be efficiently synthesized by using the reaction conditions used in the reaction between the above-described alcohol compound (a3) and the compound represented by formula (4).

However, a so-called macromolecular reaction such as the reaction between the hydroxyl group-terminated polyisobutylene polymer (a7) and the compound represented by formula (4) usually has poor reaction efficiency, and also a linear synthesis method generally tends to result in a lower yield of the target product compared with a convergent synthesis method. Therefore, this method is recommended only for cases in which there is a particular need.

Further, the (meth)acryloyl-terminated polyisobutylene polymer (A) can also be synthesized by reacting a polyisobutylene polymer (a8) having a halogen group on an end represented by the following general formula (8):

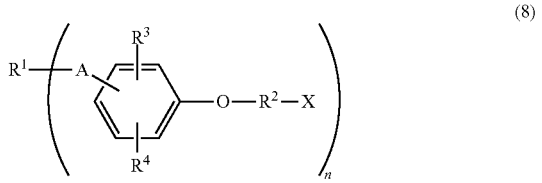

wherein A, $R^1$, $R^2$, $R^3$, $R^4$, X, and n are the same as described above;

with the above-mentioned compound represented by the general formula (6):

$$HOC(O)C(R^5)=CH_2 \quad (6)$$

wherein $R^5$ is the same as described above.

In this case too, the (meth)acryloyl-terminated polyisobutylene polymer (A) can be efficiently synthesized by using the reaction conditions used in the reaction between the above-described compound (a4) having a phenoxy group and a halogen group and the compound represented by general formula (6).

A polymerization inhibitor can be added to the (meth)acryloyl-terminated polyisobutylene polymer (A) according to the present invention during purification after polymerization or storage if necessary. Examples of the polymerization inhibitor may include phenol compounds such as hydroquinone, hydroquinone monomethyl ether, p-tert-butylcatechol, 4-methoxy-naphthol, 2,6-di-t-butyl-4-methylphenol, 2,2'-methylenebis(4-ethyl-6-t-butylphenol), 2,6-di-t-butyl-N,N-dimethylamino-p-cresol, 2,4-dimethyl-6-t-butylphenol, 4-t-butylcatechol, 4,4'-thio-bis(3-methyl-6-t-butylphenol) and 4,4'-butylidene-bis(3-methyl-6-t-butylphenol); N-oxy radical compounds such as 4-hydroxy-2,2,6,6-tetramethylpiperidine-n-oxyl, 4-acetamino-2,2,6,6-tetramethylpiperidine-N-oxyl, 4-benzoxy-2,2,6,6-tetramethylpiperidine-N-oxyl, 4-oxo-2,2,6,6-tetramethylpiperidine-N-oxyl and 2,2,6,6-tetramethylpiperidine-N-oxyl; amine compounds such as phenothiazine, N,N'-diphenyl-p-phenylenediamine, phenyl-β-naphthylamine, N,N'-di-β-naphthyl-p-phenylenediamine and N-phenyl-N'-isopropyl-p-phenylenediamine; hydroxylamine compounds such as 1,4-dihydroxy-2,2,6,6-tetramethylpiperidine and 4-dihydroxy-2,2,6,6-tetramethylpiperidine; quinone compounds such as benzoquinone and 2,5-di-t-butylhydroquinone; ferrous chloride; copper compounds such as copper dimethyl dithiocarbamate and the like.

These can be used alone or as a mixture of two or more thereof.

Among the above-described polymerization inhibitors, N-oxy radical compounds, phenol compounds, amino compounds and hydroxylamine compounds are preferable. Among these, from the perspective of effectively suppressing polymerization, N-oxy radical compounds, N-oxy radical compounds and phenol compounds are more preferable.

The above-described polymerization inhibitor can be used with another polymerization inhibitor. If the above-described polymerization inhibitor is used with another polymerization inhibitor, a better polymerization suppression effect can be obtained based on a synergistic effect from the use of the two inhibitors.

From the perspective of sufficiently exhibiting a polymerization suppression effect, the amount of the polymerization inhibitor to be used is 1 to 5,000 ppm by mass based on the (meth)acryloyl-terminated polyisobutylene polymer, and desirably is 50 to 3,000 ppm by mass.

The active energy ray-curable composition according to the present invention contains an (meth)acryloyl-terminated polyisobutylene polymer (A) represented by the following general formula (1):

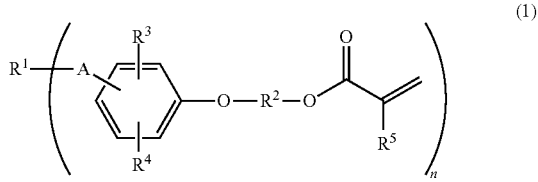

wherein $R^1$ represents a monovalent or polyvalent aromatic hydrocarbon group, or a monovalent or a polyvalent aliphatic hydrocarbon group; A represents a polyisobutylene polymer; $R^2$ represents a divalent saturated hydrocarbon group having 2 to 6 carbon atoms, which contains no hetero atoms; $R^3$ and $R^4$ each represent hydrogen, a monovalent hydrocarbon group having 1 to 20 carbon atoms, or an alkoxy group having 1 to 20 carbon atoms; $R^5$ represents hydrogen or a methyl group; and n denotes a natural number, and an active energy ray polymerization initiator (B).

It is preferable to use as the active energy ray polymerization initiator (B) a photo-radical initiator or a photo-anionic initiator. The initiator to be used can be used alone or as a mixture of two or more thereof. When using a mixture, the amount of each initiator to be used is preferably within the respective ranges described below.

Although the active energy ray polymerization initiator (B) used in the present invention is not especially limited, photo-radical initiators and photo-anionic initiators are preferable, and photo-radical initiators are especially preferable. Examples thereof include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 2,2-diethoxyacetophenone, 4-methoxyacetophen, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone, bis(4-diethylaminophenyl)ketone, 2,4,6-trimethylbenzophenone, 3,3'-dimethyl-4-methoxybenzophenone, 2-benzoyl benzoic acid, methyl 2-benzoylbenzoate, dibenzosuberone, benzyl methoxy ketal, 2-chlorothioxanthone, 2,2-dimethoxy-1,2-diphenylethan-1-one, 1-hydroxycyclohexyl-phenyl-ketone, 2-hydroxy-2-methyl-1-phenyl-propan-1-one, 2-methyl-1-[4-(methylthio)phenyl]-2-morpholinopropan-1-one, 2-benzyl-2-dimethylamino-1-(4-morpholinophenyl)-butanone-1, bis(2,4,6-trimethylbenzoyl)-phenylphosphine oxide, bis(2,6-dimethoxybenzoyl)-2,4,4-trimethylpentylphosphine oxide, 2,4,6-trimethylbenzoyl-diphenyl-phosphine oxide and the like. Among these, a compound having a hydroxyl group and a phenyl ketone structure, a compound having a benzophenone structure, and a compound having an acyl phosphine oxide structure are preferable. Specifically, 3-methoxybenzophenone, 4-methylbenzophenone, 4-chlorobenzophenone, 4,4'-dimethoxybenzophenone, 4-chloro-4'-benzylbenzophenone, 1-hydroxy-cyclohexyl-phenyl-ketone, 2-hydroxy-2-methyl-1-phenyl-propan-1-one, 2-benzyl-2-dimethylamino-1-(4-morpholinophenyl)-butanone-1, bis(2,4,6-trimethylbenzoyl)-phenylphosphine oxide, bis(2,6-dimethoxybenzoyl)-2,4,4-trimethylpentylphosphine oxide, and 2,4,6-trimethylbenzoyl-diphenyl-phosphine oxide are preferable. Especially 2,2-dimethoxy-1,2-diphenylethan-1-one, 1-hydroxy-cyclohexyl-phenyl-ketone, 2-hydroxy-2-methyl-1-phenyl-propan-1-one, bis(2,6-dimethoxybenzoyl)-2,4,4-trimethylpentylphosphine oxide, and 2,4,6-trimethylbenzoyl-diphenyl-phosphine oxide are preferable. These initiators can be used alone or in combination with another compound. Specific examples thereof include a combination with an amine, such as diethanol/methylamine, dimethylethanolamine, and triethanolamine, as well as a combination in addition to this with an iodonium salt such as diphenyl iodonium chloride, or a combination with a pigment such as Methylene blue and an amine.

When using the above-described active energy ray polymerization initiator (B), a polymerization inhibitor such as hydroquinone, hydroquinone monomethyl ether, benzoquinone, and p-tert-butylcatechol may be added if necessary.

Further, a near-infrared ray-absorbing cationic dye may be used as a near-infrared active energy ray polymerization initiator. As the near-infrared ray-absorbing cationic dye, it is preferable to use a near-infrared ray absorbing cationic dye-borate anionic complex or the like disclosed in, for example, JP 3-111402 A and JP 5-194619 A, which is excited by light energy in the region of 650 to 1,500 nm, and more preferable to use it with a boron-based sensitizer.

Although the amount of the active energy ray polymerization initiator (B) to be added is not especially limited, 0.001 to 20 parts by weight per 100 parts by weight of the polyisobutylene polymer (A) is preferable, and 0.05 to 10 parts by weight is more preferable. If the amount of the active energy ray polymerization initiator to be added is 0.001 parts by weight or less, sufficient curing properties may not be obtained. On the other hand, if the amount to be added is 20 parts by weight or more, the active energy rays do not reach the deeper portions, so that an uncured layer may form on the composition surface, or the thick film curability may deteriorate, or the heat resistance of the cured product may deteriorate.

Although the method for curing the active energy ray-curable composition according to the present invention is not especially limited, examples may include irradiating light or an electron beam with a high pressure mercury lamp, a low pressure mercury lamp, an electron beam irradiation device, a halogen lamp, a light emitting diode, a semiconductor laser and the like, depending on the nature of the active energy ray polymerization initiator.

To adjust the various physical properties of the active energy ray-curable composition according to the present invention or the cured product thereof, various additives may be added to the composition or cured product if necessary. Examples of such additives include an adhesion promoter, a plasticizer, a filler, fine hollow particles, a physical property modifier, a silanol-containing compound, a light stabilizer, a mold release agent, a flame retardant, a radical polymerization inhibitor, a metal deactivator, an antiozonant, a UV absorber, a lubricant, a pigment, a blowing agent and the like. These various additives can be used alone or in combination of two or more thereof.

Specific examples of such additives are described in various specifications and the like, such as WO 2007-069600, JP 4-69659 B, JP 7-108928 B, JP 63-254149 A, and JP 64-22904 A. Depending on the intended purpose, the active energy ray-curable composition according to the present invention may also be used with a polymerizable monomer and/or oligomer or various additives. As the polymerizable monomer and/or oligomer, a monomer and/or oligomer having a radical-polymerizable group, or a monomer and/or oligomer having an anion-polymerizable group is preferable.

Examples of the radical-polymerizable group include an acrylic functional group such as a (meth)acrylic group, a styrene group, an acrylonitrile group, a vinyl ester group, an N-vinylpyrrolidone group, an acrylamide group, a conjugated diene group, a vinyl ketone group, a vinyl chloride group and the like. Among these, a group having a (meth)acrylic group is preferable. Examples of the anion-polymerizable group include a (meth)acrylic group, a styrene group, an acrylonitrile group, an N-vinylpyrrolidone group, an acrylamide group, a conjugated diene group, a vinyl ketone group and the like. Among these, an acrylic functional group is preferable.

Specific examples of the above-described monomers include a (meth)acrylate monomer, a cyclic acrylate, N-vinylpyrrolidone, a styrene monomer, acrylonitrile, N-vinylpyrrolidone, an acrylamide monomer, a conjugated diene monomer, a vinyl ketone monomer and the like.

Examples of the (meth)acrylate monomer include (meth) acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-pentyl (meth)acrylate, isoamyl (meth)acrylate, n-hexyl (meth)acrylate, cyclohexyl (meth)acrylate, n-heptyl (meth)acrylate, n-octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, behenyl (meth)acrylate, phenyl (meth)acrylate, toluoyl (meth)acrylate, tolyl (meth)acrylate, 4-tert-butylcyclohexyl (meth)acrylate, dicyclopentenyl (meth) acrylate, dicyclopentenyloxyethyl (meth)acrylate, dicyclopentanyl (meth)acrylate, dicyclopentanyloxyethyl (meth)acrylate, isobornyl (meth)acrylate, tetrahydrofurfuryl (meth)acrylate, 3,3,5-trimethylcyclohexyl (meth)acrylate, adamantyl (meth)acrylate, 3-hydroxy-1-adamantyl (meth) acrylate, 1-methyladamantyl (meth)acrylate, 1-ethyladamantyl (meth)acrylate, 3,5-dihydroxy-1-adamantyl (meth) acrylate, benzyl (meth)acrylate, 2-methoxyethyl (meth) acrylate, 2-butoxyethyl (meth)acrylate, 2-ethoxyethyl (meth)acrylate, 3-methoxybutyl (meth)acrylate, phenoxyethyl (meth)acrylate, ethylcarbitol (meth)acrylate, methoxy triethylene glycol (meth)acrylate, ethoxy diethylene glycol (meth)acrylate, 2-hydroxy-3-phenoxypropyl (meth)acrylate, 2-ethylhexyl diethylene glycol (meth)acrylate, methoxy-dipropylene glycol (meth)acrylate, 2-hydroxyethyl (meth) acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol (meth) acrylate, glycerin (meth)acrylate, polyethylene glycol (meth)acrylate (Blemmer PE-90, PE-200, PE-350, PE-350G, AE-90, AE-200, AE-400 etc., manufactured by NOF Corporation), polypropylene glycol (meth)acrylate (Blemmer PP-500, PP-800, PP-1000, AP-150, AP-400, AP-550 etc., manufactured by NOF Corporation), polyethylene glycol-polypropylene glycol (meth)acrylate (Blemmer 50PEP-300, 70PEP-350B etc., manufactured by NOF Corporation), polyethylene glycol-polypropylene glycol (meth) acrylate, polyethylene glycol-polytetramethylene glycol (meth)acrylate, polypropylene glycol-polytetramethylene glycol (meth)acrylate, polyethylene glycol-polybutylene glycol (meth)acrylate, glycidyl (meth)acrylate, 4-hydroxybutyl-glycidyl ether (meth)acrylate, dimethylaminoethyl (meth)acrylate, diethylaminoethyl (meth)acrylate, a dimethylaminoethyl (meth)acrylate quaternary product (Light Ester DQ-100, DQ-75, etc., manufactured by Kyoeisha Chemical Co., Ltd.), 2-methyl-2-ethyl-1,3-dioxolane 4-(meth)acrylate, 1,4-dioxaspiro[4,5]dec-2-ylmethyl 2-(meth)acrylate (CHDOL-10, manufactured by Osaka Organic Chemical Industry Ltd.), 3-ethyl-3-oxetanyl (meth)acrylate (OXE-10, manufactured by Osaka Organic Chemical Industry Ltd.), γ-butyrolactone (meth)acrylate, 2-phenylthioethyl (meth) acrylate, 2-hydroxy-3-(2-propenyloxy)propyl (meth)acrylate, a phthalic anhydride-2-hydroxypropyl (meth)acrylate adduct (Viscoat #2100, manufactured by Osaka Organic Chemical Industry Ltd.), 2-(meth)acryloyloxyethyl phthalic acid (Light Ester HPA-MPL manufactured by Kyoeisha Chemical Co., Ltd., CB-1 manufactured by Shin-Nakamura Chemical Co., Ltd., etc.), mono{1-methyl-2-[(1-oxo-2-propenyl)oxy]ethyl}ester 1,2-cyclohexyldicarboxylate (Viscoat #2150 manufactured by Osaka Organic Chemical Industry Ltd.), (meth)acryloyloxy-ethylhexahydrophthalate (Light Ester HO-HH, HOA-HH etc., manufactured by Kyoeisha Chemical Co., Ltd.), (meth)acryloyloxyethylsuccinate (Light Ester HO-MS and HOA-MS manufactured by Kyoeisha Chemical Co., Ltd., SA and A-SA manufactured by Shin-Nakamura Chemical Co., Ltd., etc.), 2-(meth)acryloyloxyethyl-2-hydroxypropyl phthalic acid (Light Ester HO-MPP etc., manufactured by Kyoeisha Chemical Co., Ltd.), 2-(meth)acryloyloxyethyl-hydroxyethyl phthalate (HOA-MPE etc., manufactured by Kyoeisha Chemical Co., Ltd.), 2-(meth)acryloyloxyethyl-phosphate (Light Ester P-1M, P-2M, etc., manufactured by Kyoeisha Chemical Co., Ltd.), ethoxylated-o-phenylphenol (meth)acrylate, methoxy polyethylene glycol (meth)acrylate, (Light Ester MC, 130MA, 041MA, MTG, MTG-A, and 130A manufactured by Kyoeisha Chemical Co., Ltd., M-90G, AM-90G, M-230G, and AM130G manufactured by Shin-Nakamura Chemical Co., Ltd., Fancryl FA-400M manufactured by Hitachi Chemical Co., Ltd., Blemmer PME-100, PME-200, PME-400, PME-550, PME-1000, PME-4000, and AME-400 manufactured by NOF Corporation etc.), phenoxy polyethylene glycol (meth)acrylate (Light Acrylate P-200A manufactured by Kyoeisha Chemical Co., Ltd., AMP-20GY manufactured by Shin-Nakamura Chemical Co., Ltd., Blemmer PAE-50, PAE-100, AAE-50, and AAE-300 manufactured by NOF Corporation, Aronix M-101 and M-102 manufactured by Toagosei Co., Ltd., etc.), paracumylphenoxyethyl (meth) acrylate, nonylphenoxy polyethylene glycol (meth)acrylate (Light Acrylate NP-4EA and NP-8EA manufactured by Kyoeisha Chemical Co., Ltd., Fancryl FA-314A and FA-318A manufactured by Hitachi Chemical Co., Ltd., Blemmer ANE-1300 manufactured by NOF Corporation, M-111, M113, and M-117 manufactured by Toagosei Co., Ltd., etc.), octoxypolyethylene glycol-polypropylene glycol (meth)acrylate, lauroxypolyethylene glycol (meth)acrylate, stearoxypolyethylene glycol (meth)acrylate, phenoxy-polyethylene glycol-polypropylene glycol (meth)acrylate, nonylphenoxy-polyethylene glycol-polypropylene glycol (meth)acrylate, 3-chloro-2-hydroxypropyl (meth)acrylate, 2-(2-vinyloxyethoxy)ethyl (meth)acrylate, allyloxy polyethylene glycol-polypropylene glycol (meth)acrylate, undecyleneoxy (meth)acrylate, undecylenoxy polyethylene glycol (meth)acrylate, ω-carboxy-polycaprolactone (meth) acrylate (M-5300 etc., manufactured by Toagosei Co., Ltd.), dimer acrylate (M-5600 manufactured by Toagosei Co., Ltd., β-CEA manufactured by Daicel-Cytec Co., Ltd., etc.), N-ethylmaleimide (meth)acrylate, pentamethylpiperidinyl (meth)acrylate, tetramethylpiperidinyl (meth)acrylate, γ-(methacryloyloxypropyl)trimethoxysilane, γ-(methacryloyloxypropyl)triethoxysilane, γ-(methacryloyloxypropyl) methyldimethoxysilane, 2-isocyanate ethyl (meth)acrylate, 2-(0-[1'-methylpropylideneamino]carboxyamino)ethyl (meth)acrylate, 2-[(3,5-dimethylpyrazolyl)carbonylamino] ethyl (meth)acrylate, zinc (meth)acrylate, potassium (meth) acrylate, sodium (meth)acrylate, magnesium (meth)acrylate, calcium (meth)acrylate, barium (meth)acrylate, strontium (meth)acrylate, nickel (meth)acrylate, copper (meth)acrylate, aluminum (meth)acrylate, lithium (meth)acrylate, neodymium (meth)acrylate, trifluoromethyl methyl (meth)acrylate, 2,2,2-trifluoroethyl (meth)acrylate, 2,2,3,3-tetrafluoropropyl (meth)acrylate, 1H,1H,5H-octafluoropentyl (meth)acrylate, perfluoroethylmethyl (meth)acrylate, 2-perfluoroethylethyl (meth)acrylate, perfluoroethylperfluorobutylmethyl (meth)acrylate, 2-perfluoroethyl-2-perfluorobutylethyl (meth)acrylate, perfluoroethyl (meth)acrylate, perfluoromethyl (meth)acrylate, diperfluoromethylmethyl (meth)acrylate, 2,2-diperfluoromethylethyl (meth)acrylate, perfluoromethylperfluoroethylmethyl (meth)acrylate, 2-perfluoromethyl-2-perfluoroethylethyl (meth)acrylate, 2-perfluorohexylmethyl (meth)acrylate, 2-perfluorohexylethyl (meth)acrylate, 2-perfluorodecylmethyl (meth)acrylate, 2-perfluorodecylethyl (meth)acrylate, 2-perfluorohexadecylmethyl (meth)acrylate, 2-perfluorohexadecylethyl (meth)acrylate and the like. Here, (meth)acrylate represents acrylate and/or methacrylate, and (meth)acryloyl represents acryloyl and/or methacryloyl.

Further examples include aromatic vinyl monomers such as styrene, vinyl ketone, α-methylstyrene, p-methylstyrene, chlorostyrene, styrene sulfonic acid, salts thereof and the like; fluorine-containing vinyl monomers such as perfluoroethylene, perfluoropropylene, and vinylidene fluoride; silicon-containing vinyl monomers such as vinyl trimethoxysilane and vinyl triethoxysilane; maleic anhydride, maleic acid, and monoalkyl and dialkyl esters of maleic acid; fumaric acid and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylonitrile monomers such as acrylonitrile and methacrylonitrile; amide group-containing vinyl monomers such as acrylamide, methacrylamide, and N,N-dimethyl acrylamide; vinyl esters such as vinyl acetate, vinyl propionate, vinyl butyrate, vinyl pivalate, vinyl benzoate, and vinyl cinnamate; alkenes such as ethylene and propylene; conjugated dienes such as butadiene and isoprene; vinyl chloride, vinylidene chloride, vinyl iodide, vinyl bromide, vinylidene bromide, allyl chloride, allyl alcohol, vinyl ether, methyl vinyl ketone and the like. These can be used alone or by copolymerizing a plurality thereof.

Examples of the polyfunctional monomer include di(meth)acrylates of a saturated hydrocarbon diol such as 1,9-nonanediol di(meth)acrylate, 1,10-decanediol di(meth)acrylate, 1,6-hexane di(meth)acrylate, neopentyl glycol di(meth)acrylate, 1,4-butane di(meth)acrylate, 1,3-butane di(meth)acrylate, and 1,2-ethylene di(meth)acrylate; bifunctional (meth)acrylate compounds such as neopentyl glycol polyethoxy di(meth)acrylate, neopentyl glycol polypropoxy di(meth)acrylate, polyethylene glycol di(meth)acrylate, polypropylene glycol di(meth)acrylate, polyethylene glycol-polypropylene glycol di(meth)acrylate, polypropylene glycol-polytetramethylene glycol di(meth)acrylate, glycerin di(meth)acrylate, polytetramethylene glycol di(meth)acrylate, dimethyloltricyclodecane di(meth)acrylate, cyclohexanedimethanol di(meth)acrylate, bisphenol A diethoxy di(meth)acrylate, EO-modified bisphenol A di(meth)acrylate, PO-modified bisphenol A di(meth)acrylate, PO-EO-modified bisphenol A di(meth)acrylate, tetrabromobisphenol A diethoxy di(meth)acrylate, 4,4-dimercaptodiphenylsulfide di(meth)acrylate, bisphenol F polyethoxy di(meth)acrylate, bisphenol A polyethoxy di(meth)acrylate, 2-(2-(meth)acryloyloxy-1,1-dimethyl)-5-ethyl-5-acryloyloxymethyl-1,3-dioxane, 2-[5-ethyl-5-[(acryloyloxy)methyl]-1,3-dioxan-2-yl]-2,2-dimethylethyl, and 1,1-(bis-(meth)acryloyloxymethyl)ethylisocyanate; trifunctional (meth)acrylate compounds such as trimethylolpropane tri(meth)acrylate, trimethylolpropanepolyethoxy tri(meth)acrylate, trimethylolpropanepolypropoxy tri(meth)acrylate, tetramethylolmethane tri(meth)acrylate, isocyanuric acid tri(meth)acrylate, ethoxylated isocyanuric acid tri(meth)acrylate, pentaerythritol tri(meth)acrylate, and glycerin tri(meth)acrylate; and polyfunctional (meth)acrylate compounds such as dipentaerythritol hexa(meth)acrylate, tris(hydroxyethyl)isocyanuratepolyhexanolide tri(meth)acrylate, pentaerythritol tetra(meth)acrylate, tetramethylolmethane tetra(meth)acrylate, and ditrimethylolpropane tetra(meth)acrylate.

Examples of the oligomer include epoxy acrylate resins such as a bisphenol A-type epoxy acrylate resin, a phenol novolak type epoxy acrylate resin, a cresol novolak type epoxy acrylate resin, and a COOH group-modified epoxy acrylate resin; a urethane acrylate resin obtained by reacting a urethane resin obtained from a polyol (polytetramethylene glycol, a polyester diol of ethylene glycol and adipic acid, an ε-caprolactone-modified polyester diol, polypropylene glycol, polyethylene glycol, polycarbonate diol, hydroxyl group-terminated hydrogenated polyisoprene, hydroxyl group-terminated polybutadiene, hydroxyl group-terminated hydrogenated polybutadiene, and hydroxyl group-terminated polyisobutylene etc.) and an organic isocyanate (tolylene diisocyanate, isophorone diisocyanate, diphenylmethane diisocyanate, hexamethylene diisocyanate, xylylene diisocyanate etc.) with a hydroxyl group-containing (meth)acrylate {hydroxyethyl (meth)acrylate, hydroxypropyl (meth)acrylate, hydroxybutyl (meth)acrylate, pentaerythritol triacrylate etc.}; a resin into which a (meth)acrylic group has been introduced via an ester bond to the above-described polyol; and a so-called macromonomer, such as a polyester acrylate resin, a poly (meth)acrylacrylate resin (a poly(meth)acrylate resin having a polymerizable reaction group), a methyl methacrylate resin having a (meth)acryloyl group at one end, a styrene resin, a styrene/acrylonitrile resin, polybutyl acrylate, polyisobutyl methacrylate, a methyl methacrylate/hydroxyethyl methacrylate copolymer resin, a 2-ethylhexyl methacrylate/hydroxyethyl methacrylate copolymer resin, and a silicone resin.

Here, (meth)acrylic acid means acrylic acid and/or methacrylic acid, (meth)acrylate means acrylate and/or methacrylate, and (meth)acryloyl means acryloyl and/or methacryloyl.

These monomers and oligomers are selected based on the initiator to be used and the curing conditions.

Further, these monomers and oligomers can be used alone or in combination of two or more thereof.

In addition, the number average molecular weight of the monomer and/or oligomer having an acrylic functional group is preferably 2,000 or less, and more preferably 1,000 or less as compatibility is good.

Although the content of the polymerizable monomer and/or oligomer is not especially limited, 0.1 to 200 parts by weight per 100 parts by weight of the (meth)acryloyl-terminated polyisobutylene polymer (A) is preferable, and 1 to 50 parts by weight is more preferable. If the content is less than 0.1 parts by weight, the effect of improving physical properties may not be obtained. On the other hand, if the content is 200 parts by weight or more, the degree of curability may be too high or heat resistance may deteriorate.

A photocurable substance other than the (meth)acryloyl-terminated polyisobutylene polymer (A) according to the present invention may be added, if necessary, to the active energy ray-curable composition according to the present invention. A photocurable substance is a substance in which the molecular structure undergoes a chemical change in a short period of time due to the action of light, which causes change in properties such as curing. By adding this photocurable substance, the tackiness of the cured product surface (also referred to as residual tack) can be reduced when the curable composition is cured. Although this photocurable substance is a substance that can be cured by an irradiation of light, a representative photocurable substance is a substance that can be cured by leaving at room temperature for 1 day indoors in a place that receives sunlight (near a window), for example. Many compounds are known as such a compound, such as an organic monomer, an oligomer, a resin, or a composition including these. Although the type of this compound is not especially limited, examples thereof may include unsaturated acrylic compounds, polyvinyl cinnamates, azide resins or the like.

An unsaturated acrylic compound is a monomer, oligomer, or a mixture thereof having an unsaturated group represented by the following general formula (9):

$$CH_2=CHR^6CO(O)— \hspace{2cm} (9)$$

wherein $R^6$ represents an alkyl group having 1 to 10 carbon atoms, an aryl group having 6 to 10 carbon atoms, or an aralkyl group having 7 to 10 carbon atoms.

Specific examples of the unsaturated acrylic compound include a (meth)acrylate of a low molecular weight alcohol such as ethylene glycol, glycerin, trimethylolpropane, pentaerythritol, and neopentyl alcohol; a (meth)acrylate of a polyester polyol having a main chain of a polyester and a hydroxyl group on an end, a (meth)acrylate of a polyol having a main chain of a vinyl-type or a (meth)acrylate-type polymer and a hydroxyl group in the main chain and the like; an epoxy acrylate oligomer obtained by reacting a bisphenol A-type or a novolak type epoxy resin with a (meth)acrylic acid; and a urethane acrylate oligomer having a urethane bond and a (meth)acrylic group in the molecular chain obtained by reacting a polyol, a polyisocyanate and a hydroxyl group-containing (meth)acrylate and the like.

A polyvinyl cinnamate is a photosensitive resin having a cinnamoyl group as a photosensitive group. Examples include, in addition to a compound obtained by esterifying a polyvinyl alcohol with cinnamic acid, many polyvinyl cinnamate derivatives.

Azide resins are known as a photosensitive resin having an azide group as a photosensitive group. In addition to a rubber photosensitive solution obtained by adding an azide compound as a photosensitive agent, examples are described in detail in "Photosensitive Resins" (published on Mar. 17, 1972, by Insatsu Gakkai Shuppanbu Ltd., page 93 onwards, page 106 onwards, and page 117 onwards). These may be used alone or mixed, and a sensitizing agent may be added if necessary.

Among the above-described photocurable substances, unsaturated acrylic compounds are preferable because it is easy to handle them.

It is preferable to add 0.01 to 20 parts by weight of the photocurable substance per 100 parts by weight of the (meth)acryloyl-terminated polyisobutylene polymer (A). If the amount added is less than 0.01 parts by weight, the effect is small. On the other hand, if the amount added is more than 20 parts by weight, there can be an adverse impact on the physical properties. Further, if a sensitizing agent, such as a ketone, a nitro compound, or a promoter, such as an amine, is added, the effects can be increased.

An air-oxidation curable substance may also be added, if necessary, to the active energy ray-curable composition according to the present invention. An air-oxidation curable substance is a compound that has an unsaturated group capable of being crosslinked and cured by oxygen in the air. By adding this air-oxidation curable substance, the tackiness of the cured product surface (also referred to as residual tack) can be reduced when the curable composition is cured. This air-oxidation curable substance in the present invention is a substance that can be cured when brought into contact with air. More specifically, it has a character of being cured by reacting with oxygen in the air. A representative air-oxidation curable substance can be cured by leaving for 1 day indoors in air, for example.

Specific examples of the air-oxidation curable substance include drying oils such as tung oil and linseed oil; various alkyd resins obtained by modifying these drying oils; acrylic polymers, epoxy resins, and silicone resins modified by a drying oil; a polymer or a copolymer of 1,2-polybutadiene, 1,4-polybutadiene, or a C5 to C8 diene, as well as various modified products of such polymers or copolymers (maleated modified products, boiled oil-modified products etc.) and the like. Among these, tung oil and liquid products of a diene polymer (liquid diene polymers) or a modified product thereof are especially preferable.

Specific examples of the above-described liquid diene polymer include a liquid polymer obtained by polymerizing or copolymerizing a diene compound such as butadiene, chloroprene, isoprene, 1,3-pentadiene, a polymer, such as NBR or SBR, which can be obtained by copolymerizing such a diene compound as the main component and a monomer such as acrylonitrile or styrene that can be copolymerized with the diene compound, as well as various modified products thereof (maleated modified products, boiled oil-modified products etc.) and the like. These can be used alone or in combination of two or more thereof. Among these diene compounds, polybutadiene, polyisoprene, and poly(1,3-pentadiene) are preferable.

The air-oxidation curable substance can be used alone or in combination of two or more thereof. Further, if the air-oxidation curable substance is simultaneously used with a catalyst or a metal dryer that promotes an oxidative curing reaction, the effects can be increased. Examples of such catalysts and metal dryers include metal salts, such as cobalt naphthenate, lead naphthenate, zirconium naphthenate, cobalt octoate, and zirconium octoate, and amine compounds.

It is preferable to add 0.01 to 20 parts by weight of the air-oxidation curable substance per 100 parts by weight of the polyisobutylene polymer (A). If the amount added is less than 0.01 parts by weight, the effect is small, while if the amount added is more than 20 parts by weight, there can be an adverse impact on the physical properties.

From the perspective of improving gas barrier properties, the composition according to the present invention may also contain an ethylene-vinyl alcohol copolymer. It is preferable that the ethylene content in the ethylene-vinyl alcohol copolymer be 20 to 70 mol %. If the ethylene content is less than 20 mol %, not only are moisture barrier properties and flexibility poor, but flex resistance and heat moldability can also be poor. Further, if the ethylene content is more than 70 mol %, gas barrier properties may be insufficient. The content of the ethylene-vinyl alcohol copolymer is preferably 1 to 400 parts by weight per 100 parts by weight of the polyisobutylene polymer (A), and more preferably 10 to 400 parts by weight. If the content of the ethylene-vinyl alcohol copolymer is more than 400 parts by weight, flexibility can be lost and bending fatigue properties in the long term may deteriorate.

The composition according to the present invention may also contain a tackifier. Examples of the tackifier include natural rosin, a terpene phenolic resin having a hydroxyl value (OH value) of 50 mgKOH/g or less, a synthetic coumaroneindene resin, a petroleum resin, an alkylphenol resin and the like. The content of the tackifier is preferably 1 to 80 parts by weight per 100 parts by weight of the polyisobutylene block copolymer. Depending on the intended purpose, a filler, a softener, and a processing aid may further be added to the composition according to the present invention. Examples of a filler include carbon black, wet silica, dry silica, calcium carbonate, kaolin, talc, clay and the like. Examples of a softener include paraffinic oils, naphthenic oils, aromatic oils, rapeseed oil, dioctyl phthalate, dioctyl adipate and the like. Examples of a processing aid include higher fatty acids, fatty acid esters, fatty acid metal salts, fatty acid amides, paraffin wax, fatty alcohols, fluorine- or silicone-based resins, and high molecular weight polyethylene.

The composition according to the present invention may also contain an antioxidant if necessary.

Examples of the antioxidant include hindered phenol antioxidants, hindered amine antioxidants, phosphorus antioxidants, sulfur antioxidants, and amine antioxidants.

The hindered phenol antioxidant is not especially limited, and conventionally known hindered phenol antioxidants may be widely used. From the perspectives of compatibility with the curable composition and excellent heat resistance of the obtained cured product, preferable hindered phenol antioxidants include ADK STAB AO-50, ADK STAB AO-80, IRGANOX-1010, IRGANOX-1076, IRGANOX-1141, IRGANOX-1520, and Sumilizer GA-80.

The hindered amine antioxidant is not especially limited, and conventionally known hindered amine antioxidants may be widely used. The hindered amine antioxidants are compounds having at least one hindered piperidine group in one molecule.

From the perspectives of storage stability of the curable composition and excellent weatherability of the obtained cured product, preferable hindered amine antioxidants include ADK STAB LA-63, ADK STAB LA-63P, TINUVIN 152, TINUVIN 123, Sanol LS765, Hostavin N24, and Hostavin N30.

The phosphorus antioxidant is not especially limited, and an arbitrary compound can be used. Since phosphoric acid and phosphates that contain an active hydrogen affect the storage stability of the composition and the heat resistance of the cured product, alkyl phosphites, aryl phosphites, alkyl aryl phosphite compounds and the like that do not include phosphoric acid or a phosphate in the molecule are preferable.

With regard to the phosphorus antioxidant, it is preferable that at least two substituents on the phosphorus atom are aryloxy groups from the perspectives of stability against hydrolysis and excellent heat resistance. Specifically preferable examples of phosphorus antioxidants include ADK STAB 1178, ADK STAB 329K, ADK STAB 135A, ADK STAB C, ADK STAB TPP, ADK STAB 2112, ADK STAB HP-10, JPM-313, JPP-100, CHELEX-M, and IRGAFOS 38.

The amine antioxidant used in the present invention is not especially limited, and conventionally known amine antioxidants may be widely used. Specific examples of amine-ketone compounds include a 2,2,4-trimethyl-1,2-dihydroquinoline polymer, 6-ethoxy-1,2-dihydro-2,2,4-trimethylquinoline, and the reaction product of a diphenylamine and acetone. Examples given in terms of specific trade names include, but are not limited to, Nocrac 224, Nocrac AW, Nocrac AW-N, Nocrac B, and Nocrac B-N (all manufactured by Ouchi Shinko Chemical Industrial Co., Ltd.), Antage RD, Antage RD-G, and Antage AW (all manufactured by Kawaguchi Chemical Industry Co., Ltd.), NONFLEX RD, NONFLEX QS, NONFLEX AW, NONFLEX BA, NONFLEX BA-P, and NONFLEX BAR (all manufactured by Seiko Chemical Co., Ltd.), Vulkanox HS/LG, Vulkanox HS/powder (both manufactured by Bayer AG), Korestab TMQ (manufactured by S&S Japan Co., Ltd.), and Aminox (manufactured by Shiraishi Calcium Kaisha, Ltd.).

Examples of aromatic amine compounds include naphthylamine-based antioxidants, diphenylamine-based antioxidants, and p-phenylenediamine-based antioxidants. From the perspective of excellent heat resistance, 4,4'-bis($\alpha,\alpha$-dimethylbenzyl)diphenylamine, N,N'-di-2-naphthyl-p-phenylenediamine, and N-phenyl-N'-(3-methacryloyloxy-2-hydroxypropyl)-p-phenylenediamine are more preferable as the aromatic amine antioxidant.

The sulfur antioxidant is not especially limited, and conventionally known sulfur antioxidants may be widely used. However, since thiol-containing compounds affect the curability, a sulfur antioxidant that has a thioether structure in the molecule is preferable. Specific examples include 4,4'-thiobis(3-methyl-6-tert-butylphenol), dilauryl-thiodipropionate, bis{2-methyl-4-[3-n-alkyl($C_{12}$ or $C_{14}$)thiopropionyloxy]-5-tert-butyl phenyl}sulfide, pentaerythrityl-tetrakis(3-laurylthiopropionate), ditridecyl-3,3'-thiodipropionate, distearyl-thiodipropionate, 2,2-thiodiethylene bis[3-(3,5-di-t-butyl-4-hydroxyphenyl) propionate], 4,6-bis[(octylthio)methyl]o-cresol, 2,4-bis-(n-octylthio)-6-(4-hydroxy-3,5-di-t-butylanilino)-1,3,5-triazine, dimyristyl-3,3'-thiodipropionate, dibutyl methylene-bis-thioglycolate and the like.

It is preferable to add 0.1 to 20 parts by weight of the anti-aging agent per 100 parts by weight of the (meth)acryloyl-terminated polyisobutylene polymer (A). If the amount is less than 0.1 parts by weight, the heat resistance of the cured product may be insufficient. On the other hand, if the amount is more than 20 parts by weight, there can be an adverse impact on the physical properties and curing properties. These antioxidants can be used alone or in combination of two or more thereof. If combining two or more, it is preferable to combine a primary antioxidant such as a hindered phenol antioxidant or a hindered amine antioxidant, and a secondary antioxidant such as a phosphorus antioxidant or a sulfur antioxidant.

Although the method for preparing the active energy ray-curable composition according to the present invention is not especially limited, the active energy ray-curable composition may be prepared as a one-pack type by blending all of the components to be added or prepared as a two-pack type by separately blending the components to be added, in consideration of the storage stability of the composition and the like, which are to be mixed before use.

In the case of a one-pack type, it is not necessary to carry out mixing and kneading when applying, and measurement mistakes (mistakes in the mixing ratio) are also eliminated during such work. Consequently, mistakes such as curing defects can be prevented.

In the case of a two-pack type, the components to be blended can be arbitrarily divided into two packs which are to be mixed before use. When dividing into a pack A and a pack B, various combinations can be employed in consideration of the mixing ratio, storage stability, mixing method, potlife and the like of the curable composition.

Further, if necessary, a three-pack curable composition can be employed by preparing a third component in addition to the pack A and the pack B. Moreover, the components to be blended can be divided even more as necessary.

The method for mixing the composition according to the present invention is not especially limited. For example, the composition can be produced by blending the above-described components, shading the blend from light if necessary, and kneading the blend using a hand mixer, a static mixer, a planetary mixer, a disperser, a roll, a kneader, a single-screw extruder, a twin-screw extruder, a Banbury mixer, a Brabender mixer, a high-shear mixer and the like. Regarding the temperature of kneading, a common method may be employed, such as kneading at an ordinary temperature or under heating, or using a small amount of a suitable solvent to dissolve the components and mixing.

The cured product according to the present invention that is obtained by curing with active energy rays can be formed as a rubber-like cured product or as a gel-like cured product. The composition of the cured product is characterized by having a very low halogen atom content. The content of halogen atoms coming from the polyisobutylene polymer can be 500 ppm or less, and more preferably can be 100 ppm or less.

The cured product according to the present invention has excellent curing properties of the cured product surface. Namely, it was discovered that the active energy ray-curable composition according to the present invention has the excellent characteristic that the crosslinking reaction at the composition surface caused by active energy rays is less susceptible to inhibition caused by oxygen and the like. Therefore, the cured product according to the present invention has the excellent characteristic that a resin-like uncured layer is not formed on the surface of the cured product after irradiation of active energy rays.

Although applications of the active energy ray-curable composition and cured product according to the present invention are not limited, they can be used in various applications, such as for a sealing material, a sealant, a coating material, a potting material, a fixed gasket, a formed-in-place gasket, an adhesive, a pressure-sensitive adhesive, a filler, a molding, a foam, a film, a casting material, an ink, an anti-vibration material, a damping material, a sound-proofing material, a seismic isolation material and the like.

In electrical and electronic applications, for example, the active energy ray-curable composition and cured product according to the present invention can be used for an LED material, various battery peripheral materials, a sensor, a semiconductor peripheral material, a circuit board peripheral material, a display peripheral material for liquid crystals and the like, an optical communication/optical circuit peripheral material, an optical recording peripheral material, a magnetic recording material and the like.

For an LED material, the active energy ray-curable composition and cured product according to the present invention can be used as a molding material, a sealant, a sealing film, a die-bonding material, a coating material, a sealing material, an adhesive, a pressure-sensitive adhesive, a lens material and the like for an LED element, as well as a sealing material, an adhesive, a pressure-sensitive adhesive, a coating material and the like for an LED bulb, an LED indicator, an LED display board, an LED display device and the like.

For a battery peripheral material, the active energy ray-curable composition and cured product according to the present invention can be used as a sealing material, a rear face sealant, a molding material for various elements, an adhesive, a pressure-sensitive adhesive, a sealant, a sealing film, a coating material, a potting material, a filler, a separator, a catalyst fixing film, a protective film, an electrode binding agent, a sealing material for refrigerant oil, a hose material and the like for a lithium-ion battery, a sodium-sulfur battery, a sodium molten-salt battery, a nickel-metal hydride battery, a nickel cadmium battery, a redox flow battery, a lithium sulfur battery, an air battery, an electrolytic capacitor, an electric double layer capacitor, a lithium ion capacitor, a fuel cell, a solar cell, a dye-sensitized solar cell and the like.

For a sensor, the active energy ray-curable composition and cured product according to the present invention can be used as a sealant, a sealing film, a lens material, an adhesive, a pressure-sensitive adhesive, a coating agent, a film and the like for various kinds of sensor, such as a sensor for power, load, pressure, rotation, vibration, flow rate, solar radiation, light, smell, time, temperature, humidity, wind speed, distance, position, inertia, slope, velocity, acceleration, angular velocity, hardness, strain, sound, magnetism, current, voltage, power, electron, radiation, infrared ray, X-ray, UV-ray, fluid volume, weight, gas volume, ion content, metal content, color and the like.

For a circuit board peripheral material, the active energy ray-curable composition and cured product according to the present invention can be used as a sealing material, a coating material, a potting material, a molding material for each of the below-described elements, an underfill material, a die-bonding material, a die bonding film, an adhesive, a pressure-sensitive adhesive, a sealant, a sealing film and the like for a rigid or a flexible wiring board or MEMS (micro-electro-mechanical system) on which various elements are mounted, such as an IC, an LSI, a semiconductor chip, a transistor, a diode, a thyristor, a capacitor, a resistor, a coil and the like.

For a display peripheral material, the active energy ray-curable composition and cured product according to the present invention can be used as a molding material for various elements, various filters, a film such as a protective film, an antireflection film, a viewing angle compensation film, a polarizer protective film and an optical compensation film, a sealing material, an adhesive, a pressure-sensitive adhesive, a sealant, a sealing film, a coating material of a substrate or a material, a potting agent, a filler, a visibility improver, a lens material, a light guide plate, a prism sheet, a polarizing plate, a retardation plate, and a liquid crystal dam material for a liquid crystal display, a plasma display, a LED display device, an organic EL (electroluminescence) display, a field emission display, electronic paper, a flexible display, a 3D hologram, an organic thin film transistor display, a head-mounted display and the like.

For an optical communication/optical circuit peripheral material, the active energy ray-curable composition and cured product according to the present invention can be used as a molding material for various elements, a sealing material, an adhesive, a pressure-sensitive adhesive, a sealant, a sealing film, a coating material, a potting agent, a filler, a protective film, a lens material, a light guide plate, a prism sheet, a polarizing plate, a ferrule and the like for an organic photorefractive element, an optical fiber, an optical switch, a lens, an optical waveguide, a light emitting element, a photodiode, an optical amplifier, an optoelectronic integrated circuit, an optical connector, an optical coupler, an optical processing element, a photoelectric converter, a laser element and the like.

For an optical recording material, the active energy ray-curable composition and cured product according to the present invention can be used as a protective film, a sealing material, an adhesive, a pressure-sensitive adhesive, a sealant, a sealing film, a coating material, an anti-vibration material, and a damping material for a VD (video disc), a CD, a CD-ROM, a CD-R, a CD-RW, a DVD, a DVD-ROM, a DVD-R, a DVD-RW, a BD, a BD-ROM, a BD-R, a BD-RE, an MO, an MD, a PD (phase change disc), a hologram, a disc substrate material for an optical card, a pickup lens and the like.

For a magnetic recording material, the active energy ray-curable composition and cured product according to the present invention can be used as a vibration-proofing material, a damping material, a sealing material, an adhesive, a pressure-sensitive adhesive, a sealant, a coating material, a cover gasket, and a card material for a hard disk, a magnetic tape, and a magnetic card such as a credit card.

In addition, the active energy ray-curable composition and cured product according to the present invention can also be used as a touch panel dirt-resistant film, a lubricating film, an IC chip molding material, a Peltier element molding material, an electrolytic capacitor sealing body, a cable joint potting material, a potting material for an IGBT (a vehicle propulsion control device), a semiconductor wafer processing dicing tape, a die-bonding agent, a die-bonding film, underfill, an anisotropic conductive adhesive, an anisotropic conductive film, a conductive adhesive, a conductive paste, a thermally conductive adhesive, a thermally conductive paste, a temporary fixing film, a fixing film, a sealing film and the like.

In automotive applications, as a body part, the active energy ray-curable composition and cured product according to the present invention may be used as a sealing material for maintaining airtightness, an anti-vibration material for glass, a car body section vibration-proofing material, and especially as a window seal gasket and a door glass gasket. As a chassis part, the active energy ray-curable composition and cured product according to the present invention can be used as engine or suspension rubber for vibration proofing and sound proofing, and especially as an engine-mounted rubber and a sealing material for a vibration proofing mount. As an engine part, the active energy ray-curable composition and cured product according to the present invention can be used for a hose for cooling, fuel supply, exhaust control and the like, a gasket for an engine cover or an oil pan, an engine oil sealing material and the like. Further, as a tire part, the active energy ray-curable composition and cured product according to the present invention can be used as a bead portion, a sidewall portion, a shoulder portion, and a tread portion, or as a sealing material for an inner liner resin or an air-pressure sensor or puncture sensor. In addition, the active energy ray-curable composition and cured product according to the present invention can be used as a sealing material, a sealant, a gasket, a coating material, a molding member, an adhesive, and a pressure-sensitive adhesive for various electronic components and control components. Still further, the active energy ray-curable composition and cured product according to the present invention can be used as a covering material for a wire harness made from copper or aluminum, or as a sealing material for a connector part. Additionally, the active energy ray-curable composition and cured product according to the present invention can also be used as a sealing material, an adhesive, a pressure-sensitive adhesive, molded part such as a gasket, an O-ring, packing and a belt, and the like, for a lamp, a battery, a windshield washer fluid unit, an air conditioning unit, a coolant unit, a brake oil unit, an electrical part, various interior and exterior parts, an oil filter and the like, as well as a potting material for an igniter HIC or an automotive hybrid IC.

In industrial applications, the active energy ray-curable composition and cured product according to the present invention can be used for resist applications, such as permanent resist applications, solder resist applications, dry-film resist applications, and electrodeposition resist applications.

For information electrical devices, the active energy ray-curable composition and cured product according to the present invention can be used as a sealing material, a sealant, an adhesive, a pressure-sensitive adhesive, packing, an O-ring, a belt, a vibration-proofing material, a damping material, a sound-proofing material and the like for a mobile phone, a media player, a tablet terminal, a smartphone, a portable game machine, a computer, a printer, a scanner, a projector, an inkjet tank and the like.

In the field of consumer electronics, the active energy ray-curable composition and cured product according to the present invention can be used as a sealing material, an adhesive, a pressure-sensitive adhesive, packing, an O-ring, a belt, a vibration-proofing material, a damping material, a sound-proofing material and the like for various electrical products, such as a television, various recorders, such as a Blu-ray recorder and an HDD recorder, a projector, a game console, a digital camera, a home video machine, an antenna, a speaker, an electronic dictionary, an IC recorder, a FAX, a copying machine, a telephone machine, an intercom, a rice cooker, a microwave oven, an oven range, a refrigerator, a dishwasher, a tableware dryer, an IH cooking heater, a hotplate, a vacuum cleaner, a washing machine, a charger, a sewing machine, an iron, a dryer, an electric bicycle, an air purifier, a water purifier, an electric toothbrush, lighting fixtures, an air conditioner, an outdoor air conditioner, a dehumidifier, a humidifier and the like.

For leisure applications, the active energy ray-curable composition and cured product according to the present invention can be used for a piece of swimming equipment, such as a swimming cap, a diving mask, and an ear plug, a gel cushioning member in sports shoes, baseball gloves and the like, an adhesive or a shock absorber in a golf ball, a club, a racket and the like.

For a molding, the active energy ray-curable composition and cured product according to the present invention can be used as packing, an O-ring, a belt, a tube, a hose, a valve, a sheet and the like.

Further, the active energy ray-curable composition and cured product according to the present invention can also be used for a reactive hot melt agent for a wiring connector, and for various kinds of adhesive, such as a reactive hot melt adhesive, an OCA (optically transparent adhesive), an elastic adhesive, a contact adhesive, an anaerobic adhesive, a UV-ray curable adhesive, an electron beam curable adhesive and the like.

The active energy ray-curable composition and cured product according to the present invention can also be used as an improver for butyl-based pressure-sensitive adhesive, or as various kinds of pressure-sensitive adhesive, such as pressure-sensitive adhesive for masking tape, pipe anti-corrosion tape, architectural waterproofing tape, self-fusing electrical tape, a removable pressure-sensitive adhesive, a fusing tape for electrical wire, and the like.

The active energy ray-curable composition and cured product according to the present invention can also be used in various coating applications, such as for a wiring or cable covering material or repair material thereof, an insulation sealing material for a wire connection portion, a tube inner liner for a gas pipe or a water pipe, a coating material for an inorganic filler and an organic filler, a release material for a molding in an epoxy mold and the like.

The active energy ray-curable composition and cured product according to the present invention can also be used for various sheets, such as a heat conduction sheet, a heat dissipation sheet, an electromagnetic wave absorption sheet, a conductive sheet, a waterproof sheet, an automotive protective sheet, and a panel shock absorbing sheet.

In addition, the active energy ray-curable composition and cured product according to the present invention can be used for a shock absorbing gel, a shock absorbing material in beds, shoes and the like, an intermediate layer film for laminated glass, a paint such as an elastic paint or an aqueous emulsion, a prepreg, various rollers for OA equipment and conveyance equipment, a cap liner, an ink repellent, ink, sealing materials for various refrigerant, a sealing material or gasket for industrial and food cans, a foam gasket, and a primary and secondary seal of double-glazed glass.

In medical applications, the active energy ray-curable composition and cured product according to the present invention can be used for a pressure-sensitive adhesive for a transdermal drug or patch, a pharmaceutical or medical sealing material, a medical pressure-sensitive adhesive, a medical rubber stopper, an impression material, a dental filling material, a syringe gasket, a decompressed blood vessel rubber stopper, an O-ring or a flat gasket for artificial dialysis equipment, drug or medical equipment packaging materials, a cap, a cap liner, a vacuum blood collection tube cap, a catheter sealing material or adhesive, a sealing material or adhesive for an implanted medical device and the like.

For damping material and vibration-proofing material applications, the active energy ray-curable composition and cured product according to the present invention can also be used in electrical and electronic device applications, such as for a damping material in a stepping motor, a magnetic disk, a hard disk, a dishwasher, a dryer, a washing machine, a fan heater, a sewing machine, a vending machine, a speaker frame, a BS antenna, and a VTR cover; architectural applications, such as in a roof, flooring, a shutter, a curtain rail, a floor, a plumbing duct, a deck plate, a curtain wall, stairs, a doors, a seismic isolator, a structural damping material, a viscoelastic damper, and a seismic resisting material; marine applications, such as a damping material in an engine room or a measurement room; automotive applications, such as for a damping material in an engine (oil pan, front cover, rocker cover), a car body (dashboard, floor, doors, roof, panels, wheel house), a transmission, a parking brake cover, and a damping material for seat back; camera and office equipment applications, such as a damping material for a TV camera, a copying machine, a computer, a printer, a cash register, and a cabinet; industrial applications, such as for a damping material in a shooter, an elevator, an escalator, a conveyor, a tractor, a bulldozer, a power generator, a compressor, a container, a hopper, a soundproof box, and lawn mower motor cover; railway applications, such as a damping material in a railway carriage roof, a side plate, a door, an underfloor, various auxiliary covers, and a bridge; a damping material for precision anti-vibration equipment for semiconductor applications and the like; and for a damping material for soundproofing of low-frequency sounds and high-frequency sounds near the audible threshold region.

EXAMPLES

Although the present invention will now be described in more detail with reference to the examples, the present invention is not limited to these examples. Further, the various measurement methods and evaluation methods will be described before the examples.

(Molecular Weight Measurement)

In the below examples, "number average molecular weight", "weight average molecular weight" and "molecular weight distribution (ratio of the number average molecular weight and weight average molecular weight)" were calculated by a standard polystyrene conversion method using size permeation chromatography (SEC). As the SEC system, the LC Module 1 manufactured by Waters Corporation was used. As the GPC column (stationary phase), a column filled with a polystyrene crosslinked gel (Shodex GPC K-804, manufactured by Showa Denko K.K.) was used. As the mobile phase, chloroform was used.

(Calculation of Functionalization Rate Fn)

The molecular weight of the polymer was calculated from the above GPC measurement to determine the number average molecular weight Mn. Next, $^1$H-NMR measurement was carried out, and using the above-mentioned number average molecular weight Mn, the surface area of the peaks attributable to the two methyl groups in the polyisobutylene skeleton near 1.3 ppm was calculated as follows.

(Integral value of the peaks near 1.3 ppm)=((Number average molecular weight Mn)/56.11)×6H At this stage, the average value of the peaks in the same $^1$H-NMR chart derived from a (meth)acryloyl group appearing near 5.8 to 5.9 ppm, 6.1 to 6.2 ppm, and 6.4 ppm was calculated. This averaged integral value was used as the number of functionalization Fn.

(Gel Fraction)

About $W_1$ g of the cured product obtained in each of the following examples and comparative examples was measured out, and dipped in n-hexane (in an amount of about 200 times that of $W_1$). The resultant mixture was left to stand at 70° C. for 24 hours. Then, the mixture was cooled to room temperature. The precipitate was then recovered by filtration, and dried at 80° C. under reduced pressure for 24 hours. The weight $W_2$ of the obtained solid was measured, and the gel fraction was determined based on the following calculation equation.

Gel fraction (%)=$W_2/W_1$×100        Calculation equation:

(Residual Chlorine Concentration)

The amount of chlorine in the obtained copolymer was determined under the following conditions. As the measurement sample, a sample obtained by dissolving the obtained polymer in toluene and then reprecipitating in methanol to remove the chlorine species not bound to the copolymer molecules was used.

Measurement apparatus: TOX-10S, manufactured by Mitsubishi Chemical Corporation
Combustion temperature: 900° C.
Detection method: Oxidation and coulometric titration method
Measurement method: Same sample measured three times, and the average value thereof was taken as the measurement value.

(Gas Permeability)

<Oxygen Permeability>

The oxygen permeability was measured by a differential-pressure method under a condition of 1 atm, 23° C. and 0% RH in conformity with JIS K7126.

<Water Vapor Permeability>

The water vapor permeability was measured at 40° C., 90% RH in conformity with JIS 20208.

Further, the following was used as the active energy ray polymerization initiator.

(Active Energy Ray Polymerization Initiator)

Twenty parts by weight of DAROCURE 1173 (2-hydroxy-2-methyl-1-phenyl-propan-1-one, manufactured by Ciba Japan K.K.) and 10 parts by weight of IRGACURE 819 (bis(2,4,6-trimethylbenzoyl)-phenylphosphine oxide, manufactured by Ciba Japan K.K.) were measured out, and thoroughly mixed for 5 minutes with a spatula to prepare an active energy ray polymerization initiator mixture [1].

Example 1

Production of Acryloyl-Terminated Polyisobutylene Polymer (Component P-1)

A 5 L separable flask was purged with nitrogen, and then the flask was charged with 280 mL of n-hexane (which had been dried with a molecular sieve) and 2,500 mL of butyl chloride (which had been dried with a molecular sieve), and while stirring under a nitrogen atmosphere, cooled to −70° C. Next, 1,008 mL (10.7 mol) of isobutylene, 27.4 g (0.119 mol) of p-dicumyl chloride, and 1.33 g (0.014 mol) of α-picoline were added. The resultant reaction mixture was cooled to −70° C., then charged with 5.2 mL (0.047 mol) of titanium tetrachloride to start polymerization. After the polymerization started, the residual isobutylene concentration was measured by gas chromatography. When the residual amount of isobutylene fell below 0.5%, about 200 g of methanol was added. The solvent and the like was removed by evaporation from the reaction solution, and the resultant product was then dissolved in 2 L of n-hexane and washed three times with 1 L of pure water. The solvent was removed by evaporation under reduced pressure, and the obtained polymer was dried under vacuum for 24 hours at 80° C. to obtain a chlorine-terminated polyisobutylene polymer A-1. The molecular weight of the obtained polymer A-1 based on polystyrene was measured by size exclusion chromatography (SEC). Mw was 5,800, Mn was 5,200, and Mw/Mn was 1.12.

Next, 100 g of the obtained polyisobutylene polymer A-1, 540 ml of butyl chloride, 60 ml of n-hexane, and 15.2 g of 2-phenoxyethyl acrylate (manufactured by Tokyo Chemical Industry Co., Ltd.) were charged into a 1 L separable flask, and the resultant mixture was cooled to −70° C. while stirring. After the cooling to −70° C. or less had been completed, 22 ml of titanium tetrachloride was added. Then, after a continuous stirring for 6 hours at −70° C., 200 ml of methanol was added to stop the reaction. After fractionation of the supernatant from the reaction solution, and the removal of the solvent and the like by evaporation, the product was dissolved in 650 ml of n-hexane, washed three times with 500 ml of pure water, and reprecipitated from methanol. The solvent was then removed by evaporation under reduced pressure, and the obtained polymer was dried under vacuum for 24 hours at 80° C. to obtain the target acryloyl-terminated polyisobutylene polymer P-1. The molecular weight of the obtained polymer P-1 based on polystyrene was measured by size exclusion chromatography (SEC). Mw was 6,000, Mn was 5,400, and Mw/Mn was 1.11. Further, the Fn of the acryloyl groups introduced onto the end of the obtained acryloyl-terminated polyisobutylene P-1 was 1.93.

Example 2

Production of Acryloyl-Terminated Polyisobutylene Polymer (Component P-2)

A 1 L separable flask was purged with nitrogen, and then the flask was charged with 40 mL of n-hexane (which had been dried with a molecular sieve) and 400 mL of butyl chloride (which had been dried with a molecular sieve), and while stirring under a nitrogen atmosphere, cooled to −70° C. Next, 168 mL (1.78 mol) of isobutylene, 4.57 g (0.0198 mol) of p-dicumyl chloride, and 0.222 g (0.00233 mol) of α-picoline were added. The resultant reaction mixture was cooled to −70° C., then charged with 1.0 mL (0.0091 mol) of titanium tetrachloride to start polymerization. After the polymerization started, the residual isobutylene concentration was measured by gas chromatography. When the residual amount of isobutylene fell below 0.5%, 15.2 g of 2-phenoxyethyl acrylate (manufactured by Tokyo Chemical Industry Co., Ltd.) and 22 ml of titanium tetrachloride were added. Then, after a continuous stirring for 3 hours at −70° C., 200 ml of methanol was added to stop the reaction. After fractionation of the supernatant from the reaction solution, and the removal of the solvent and the like by evaporation, the product was dissolved in 550 ml of n-hexane, washed three times with 500 ml of pure water, and reprecipitated from methanol. The solvent was then removed by evaporation under reduced pressure, and the obtained polymer was dried under vacuum for 24 hours at 80° C. to obtain the target acryloyl-terminated polyisobutylene polymer P-2. The molecular weight of the obtained polymer P-2 based on polystyrene was measured by size exclusion chromatography (SEC). Mw was 6,300, Mn was 5,700, and Mw/Mn was 1.11. Further, the Fn of the acryloyl groups introduced onto the end of the obtained acryloyl-terminated polyisobutylene P-2 was 1.90.

Example 3

Production of Acryloyl-Terminated Polyisobutylene Polymer (Component P-3)

To 200 ml of N,N-dimethylformamide were added 40.0 g of 6-phenoxyhexyl bromide (manufactured by Tokyo Chemical Industry Co., Ltd., 0.0778 mol), 85.7 g of potassium acrylate (manufactured by Nippon Shokubai Co., Ltd., 0.778 mol), and 0.5 g of potassium iodide (manufactured by Wako Pure Chemical Industries, Ltd.), and stirring was continued for 24 hours at 150° C. Next, about 75% of the charged solvent was removed by evaporation under reduced pressure. Then, the resultant product was dissolved in 200 ml of toluene, washed once with 100 ml of saturated aqueous potassium carbonate, three times with 100 ml of pure water, once with 100 ml of saturated brine, and then dried over anhydrous magnesium sulfate. Next, the solid matter was removed by filtration, and the solvent in the filtrate was removed by evaporation under reduced pressure to obtain 6-phenoxyhexyl acrylate.

A 300 ml separable flask was purged with nitrogen, and then the flask was charged with 15 mL of n-hexane (which had been dried with a molecular sieve) and 130 mL of butyl chloride (which had been dried with a molecular sieve), and while stirring under a nitrogen atmosphere, cooled to −70° C. Next, 50 mL (0.535 mol) of isobutylene, 1.37 g (0.00595 mol) of p-dicumyl chloride, and 0.0665 g (0.0007 mol) of α-picoline were added. The resultant reaction mixture was cooled to −70° C., then charged with 0.26 mL (0.0023 mol) of titanium tetrachloride to start polymerization. After the polymerization started, the residual isobutylene concentration was measured by gas chromatography. When the residual amount of isobutylene fell below 0.5%, 14.8 g (0.0595 mol) of 6-phenoxyhexyl acrylate (manufactured by Tokyo Chemical Industry Co., Ltd.) and 13.1 mL (0.119 mol) of titanium tetrachloride were added, and stirring was continued for 4 hours at −70° C. Then, about 70 g of methanol was added. After removal of the solvent and the like from the reaction solution by evaporation, the product was dissolved in 300 ml of n-hexane, and washed three times with 300 ml of pure water. The solvent was then removed by evaporation under reduced pressure, and the obtained polymer was dried under vacuum for 24 hours at 80° C. to obtain the acryloyl-terminated polyisobutylene polymer P-3. The molecular weight of the obtained polymer P-3 based on polystyrene was measured by size exclusion chromatography (SEC). Mw was 6,000, Mn was 5,500, and Mw/Mn was 1.09.

Further, the Fn of the acryloyl groups introduced onto the end of the obtained acryloyl-terminated polyisobutylene P-3 was 1.92.

Example 4

Production of Acryloyl-Terminated Polyisobutylene Polymer (Component P-4)

A 1 L separable flask was purged with nitrogen, and then the flask was charged with 40 mL of n-hexane (which had been dried with a molecular sieve) and 400 mL of butyl chloride (which had been dried with a molecular sieve), and while stirring under a nitrogen atmosphere, cooled to −70° C. Next, 168 mL (1.78 mol) of isobutylene, 4.57 g (0.0198 mol) of p-dicumyl chloride, and 0.222 g (0.00233 mol) of α-picoline were added. The resultant reaction mixture was cooled to −70° C., then charged with 1.0 mL (0.0091 mol) of titanium tetrachloride to start polymerization. After the polymerization started, the residual isobutylene concentration was measured by gas chromatography. When the residual amount of isobutylene fell below 0.5%, 16.3 g (0.0791 mol) of 2-phenoxyethyl methacrylate (trade name: Light Ester PO, manufactured by Kyoeisha Chemical Co., Ltd.) and 22 ml of titanium tetrachloride were added. Then, after a continuous stirring for 3 hours at −70° C., 200 ml of methanol was added to stop the reaction. After fractionation of the supernatant from the reaction solution, and the removal of the solvent and the like by evaporation, the product was dissolved in 550 ml of n-hexane, washed three times with 500 ml of pure water, and reprecipitated from methanol. The solvent was then removed by evaporation under reduced pressure, and the obtained polymer was dried under vacuum for 24 hours at 80° C. to obtain the target acryloyl-terminated polyisobutylene polymer P-4. The molecular weight of the obtained polymer P-4 based on polystyrene was measured by size exclusion chromatography (SEC). Mw was 6,300, Mn was 5,700, and Mw/Mn was 1.11. Further, the Fn of the methacryloyl groups introduced onto the end of the obtained acryloyl-terminated polyisobutylene P-4 was 1.91.

Comparative Example 1

Production of Acryloyl-Terminated Polyisobutylene Polymer (Component Q-1)

A 5 L separable flask was purged with nitrogen, and then the flask was charged with 280 mL of n-hexane (which had been dried with a molecular sieve) and 2,500 mL of butyl chloride (which had been dried with a molecular sieve), and while stirring under a nitrogen atmosphere, cooled to −70° C. Next, 1,008 mL (10.7 mol) of isobutylene, 27.4 g (0.119 mol) of p-dicumyl chloride, and 1.33 g (0.014 mol) of α-picoline were added. The resultant reaction mixture was cooled to −70° C., then charged with 5.2 mL (0.047 mol) of titanium tetrachloride to start polymerization. After the polymerization started, the residual isobutylene concentration was measured by gas chromatography. When the residual amount of isobutylene fell below 0.5%, about 200 g of methanol was added. The solvent and the like was removed by evaporation from the reaction solution, and the resultant product was then dissolved in 2 L of n-hexane and washed three times with 1 L of pure water. The solvent was removed by evaporation under reduced pressure, and the obtained polymer was dried under vacuum for 24 hours at 80° C. to obtain a chlorine-terminated polyisobutylene polymer A-1. The molecular weight of the obtained polymer A-1 based on polystyrene was measured by size exclusion chromatography (SEC). Mw was 5,800, Mn was 5,200, and Mw/Mn was 1.12.

Next, 100 g of the obtained polyisobutylene polymer A-1, 540 ml of butyl chloride, 60 ml of n-hexane, and 18.7 g (0.0791 mol) of phenoxy polyethylene glycol acrylate (trade name: Light Acrylate P-200A, manufactured by Kyoeisha Chemical Co., Ltd.) were charged into a 1 L separable flask, and the resultant mixture was cooled to −70° C. while stirring. After the cooling to −70° C. or less had been completed, 22 ml of titanium tetrachloride was added. Then, after a continuous stirring for 6 hours at −70° C., 200 ml of methanol was added to stop the reaction. After fractionation of the supernatant from the reaction solution, and the removal of the solvent and the like by evaporation, the product was dissolved in 650 ml of n-hexane, washed three times with 500 ml of pure water, and reprecipitated from methanol. The solvent was then removed by evaporation under reduced pressure, and the obtained polymer was dried under vacuum for 24 hours at 80° C. to obtain the target acryloyl-terminated polyisobutylene polymer Q-1. The molecular weight of the obtained polymer Q-1 based on polystyrene was measured by size exclusion chromatography (SEC). Mw was 6,000, Mn was 5,300, and Mw/Mn was 1.13. Further, the Fn of the acryloyl groups introduced onto the end of the obtained acryloyl-terminated polyisobutylene Q-1 was 0.06.

Comparative Example 2

Production of Acryloyl-Terminated Polyisobutylene Polymer (Component Q-2)

A 5 L separable flask was purged with nitrogen, and then the flask was charged with 280 mL of n-hexane (which had been dried with a molecular sieve) and 2,500 mL of butyl chloride (which had been dried with a molecular sieve), and while stirring under a nitrogen atmosphere, cooled to −70° C. Next, 1,008 mL (10.7 mol) of isobutylene, 27.4 g (0.119 mol) of p-dicumyl chloride, and 1.33 g (0.014 mol) of α-picoline were added. The resultant reaction mixture was cooled to −70° C., then charged with 5.2 mL (0.047 mol) of titanium tetrachloride to start polymerization. After the polymerization started, the residual isobutylene concentration was measured by gas chromatography. When the residual amount of isobutylene fell below 0.5%, about 200 g of methanol was added. The solvent and the like was removed by evaporation from the reaction solution, and the resultant product was then dissolved in 2 L of n-hexane and washed three times with 1 L of pure water. The solvent was removed by evaporation under reduced pressure, and the obtained polymer was dried under vacuum for 24 hours at 80° C. to obtain a chlorine-terminated polyisobutylene polymer A-1. The molecular weight of the obtained polymer A-1 based on polystyrene was measured by size exclusion chromatography (SEC). Mw was 5,800, Mn was 5,200, and Mw/Mn was 1.12.

Next, 100 g of the obtained polyisobutylene polymer A-1, 540 ml of butyl chloride, 60 ml of n-hexane, and 15.2 g (0.0791 mol) of 2-phenoxyethyl acrylate (manufactured by Tokyo Chemical Industry Co., Ltd.) were charged into a 1 L separable flask, and 22 ml of titanium tetrachloride was added to the resultant mixture while stirring at room temperature. Then, after continuing the stirring for 6 hours at −70° C., 200 ml of methanol was added to stop the reaction. After fractionation of the supernatant from the reaction solution, and the removal of the solvent and the like by evaporation, the product was dissolved in 650 ml of n-hexane, washed three times with 500 ml of pure water, and reprecipitated from methanol. The solvent was then removed by evaporation under reduced pressure, and the obtained polymer was dried under vacuum for 24 hours at 80° C. to obtain the target acryloyl-terminated polyisobutylene polymer Q-2. The molecular weight of the obtained polymer Q-2 based on polystyrene was measured by size exclusion chromatography (SEC). Mw was 6,000, Mn was 5,500, and Mw/Mn was 1.09. Further, the Fn of the acryloyl groups introduced onto the end of the obtained acryloyl-terminated polyisobutylene Q-2 was 0.12.

Comparative Example 3

Production of Acryloyl-Terminated Polyisobutylene Polymer (Component Q-3)

A 1 L separable flask was purged with nitrogen, and then the flask was charged with 40 mL of n-hexane (which had been dried with a molecular sieve) and 400 mL of butyl chloride (which had been dried with a molecular sieve), and while stirring under a nitrogen atmosphere, cooled to −70° C. Next, 168 mL (1.78 mol) of isobutylene, 4.57 g (0.0198 mol) of p-dicumyl chloride, and 0.222 g (0.00233 mol) of α-picoline were added. The resultant reaction mixture was cooled to −70° C., then charged with 1.0 mL (0.0091 mol) of titanium tetrachloride to start polymerization. After the polymerization started, the residual isobutylene concentration was measured by gas chromatography. When the residual amount of isobutylene fell below 0.5%, 15.2 g of 2-phenoxyethyl acrylate (manufactured by Tokyo Chemical Industry Co., Ltd.) was added. Then, after a continuous stirring for 3 hours at −70° C., 200 ml of methanol was added to stop the reaction. After fractionation of the supernatant from the reaction solution, and the removal of the solvent and the like by evaporation, the product was dissolved in 550 ml of n-hexane, washed three times with 500 ml of pure water, and reprecipitated from methanol. The solvent was then removed by evaporation under reduced pressure, and the obtained polymer was dried under vacuum for 24 hours at 80° C. to obtain the target acryloyl-terminated polyisobutylene polymer Q-3. The molecular weight of the obtained polymer Q-3 based on polystyrene was measured by size exclusion chromatography (SEC). Mw was 6,100, Mn was 5,300, and Mw/Mn was 1.15. Further, the Fn of the acryloyl groups introduced onto the end of the obtained acryloyl-terminated polyisobutylene Q-3 was 0.14.

Example 5

A curable composition was obtained by measuring out 100 parts by weight of the acryloyl-terminated polyisobutylene P-1 obtained in Example 1 and 2 parts by weight of an active energy ray polymerization initiator mixture [1], and stirring for 5 minutes by hand using a spatula. Then, this curable composition was poured into a metal frame (100 mm×100 mm×0.5 mm) made of SUS304, and passed through a UV irradiation device (Model: LH6, manufactured by Fusion UV Systems Japan KK, irradiation conditions: illuminance 1,166 mW/cm$^2$ and light amount 2,600 mJ/cm$^2$) to obtain a sheet-like cured product. The gel fraction, residual chlorine concentration, and gas permeability of the obtained cured product were evaluated. The results are shown in Table 1.

Example 6

A curable composition was obtained by measuring out 100 parts by weight of the acryloyl-terminated polyisobutylene P-1 obtained in Example 1 and 2 parts by weight of an active energy ray polymerization initiator mixture [1], and stirring for 5 minutes by hand using a spatula. Then, this curable composition was poured into a metal frame (100 mm×100 mm×0.5 mm) made of SUS304, and passed through a UV irradiation device (Model: LH6, manufactured by Fusion UV Systems Japan KK, irradiation conditions: illuminance 500 mW/cm$^2$ and light amount 1,000 mJ/cm$^2$) to obtain a sheet-like cured product. The gel fraction, residual chlorine concentration, and gas permeability of the obtained cured product were evaluated. The results are shown in Table 1.

Example 7

A curable composition was obtained by measuring out 100 parts by weight of the acryloyl-terminated polyisobutylene P-1 obtained in Example 1 and 1 part by weight of an active energy ray polymerization initiator mixture [1], and stirring for 5 minutes by hand using a spatula. Then, this curable composition was poured into a metal frame (100 mm×100 mm×0.5 mm) made of SUS304, and passed through a UV irradiation device (Model: LH6, manufactured by Fusion UV Systems Japan KK, irradiation conditions: illuminance 1,166 mW/cm$^2$ and light amount 2,600 mJ/cm$^2$) to obtain a sheet-like cured product. The gel fraction, residual chlorine concentration, and gas permeability of the obtained cured product were evaluated. The results are shown in Table 1.

Example 8

A curable composition was obtained by measuring out 100 parts by weight of the acryloyl-terminated polyisobutylene P-3 obtained in Example 3 and 2 parts by weight of an active energy ray polymerization initiator mixture [1], and stirring for 5 minutes by hand using a spatula. Then, this curable composition was poured into a metal frame (100 mm×100 mm×0.5 mm) made of SUS304, and passed through a UV irradiation device (Model: LH6, manufactured by Fusion UV Systems Japan KK, irradiation conditions: illuminance 1,166 mW/cm$^2$ and light amount 2,600 mJ/cm$^2$) to obtain a sheet-like cured product. The gel fraction, residual chlorine concentration, and gas permeability of the obtained cured product were evaluated. The results are shown in Table 1.

Comparative Example 4

Production of Acryloyl-Terminated Polyisobutylene Polymer (Component Q-4)

A 5 L separable flask was provided with a three-way cock, a thermocouple, and a stirring device equipped with a vacuum seal, and purged with nitrogen. The flask was then charged with 592 ml of toluene and 73.6 ml of ethylcyclohexane that had been dehydrated with a molecular sieve 3A, and then further charged with 1,4-bis(1-chloro-1-methylethyl)benzene (5.56 g, 24.0 mmol), 2-methylpyridine (264 mg, 2.83 mmol), and cooled to −70° C. After cooling, an isobutylene monomer (120 ml, 1.44 mol) was introduced, and then titanium tetrachloride (2.52 ml, 23.0 mmol) was further added at this temperature to start polymerization. During this process the temperature rose by about 15° C. The polymerization completed in about 60 minutes (as the polymerization completed, heat released from the reaction system was no longer observed). After the polymerization finished, octadienyl acetate (32.4 g, 193 mmol) and titanium tetrachloride (39.8 ml, 386 mmol) were added. After reacting for 5 hours, the reaction mixture was brought into 1.5 L of deionized water heated to 80° C., and the resultant mixture was stirred for 20 minutes. After leaving the mixture to stand, the aqueous layer was removed, and 1 L of 2N aqueous sodium hydroxide and 10.0 g of tetrabutylammonium bromide were added. The resultant mixture was then stirred for 12 hours at 100° C. After the reaction was completed, the aqueous alkaline solution was removed. After washing three times with 1 L of deionized water, the organic layer was isolated. Then 10 L of acetone was added to the organic layer to reprecipitate the polymer, and low molecular weight compounds were then removed. The precipitate was further washed twice with 1 L of acetone, and further dissolved in 500 ml of hexane. The solution was transferred to a 1 L eggplant-shaped flask, and the solvent was removed by evaporation under reduced pressure (1 Torr or less at the end) by heating with an oil bath (180° C.) to obtain the target polyisobutylene q-4 terminated with a hydroxyl group (number average molecular weight 5,600, molecular weight distribution 1.2). Analysis of the functionalization rate of the obtained polyisobutylene was carried out using NMR.

(NMR Method) Gemini-300 manufactured by Valian Inc. Measurement solvent: a 4/1 mixed solvent of carbon tetrachloride/deuterated acetone Quantification method: The signal (4.00 ppm) of the methylene adjacent to the terminal hydroxyl group was compared with the standard signal (7.2 ppm) of the initiator residual group and quantified. Fn ($CH_2OH$) represents the introduction amount of functional groups on the polymer ends. When functional groups are quantitatively introduced, Fn is 2.0 for the initiator used in this example. The introduction amount of hydroxyl groups of the polymer obtained in Comparative Example 4 is as follows: Fn ($CH_2OH$)=1.90.

Next, a 200 ml separable flask was charged with 15.01 g (hydroxyl group equivalent 5.1 mmol) of the polyisobutylene q-4 terminated with a hydroxyl group, and 30 ml of n-butyl chloride and 0.6 ml (7.6 mmol) of pyridine that had been dehydrated with a molecular sieve 3A. A three-way cock, a thermocouple, and a stirring device equipped with a vacuum seal was attached to the flask, and the flask was purged with nitrogen. After cooling to 0° C., 0.75 ml (7.6 mmol) of methacrylic acid chloride was added. The temperature was then raised to 23° C., and the mixture was stirred for 2 hours. Since the reaction was not yet completed based on NMR, the mixture was cooled to 0° C., and then 0.5 ml (5.1 mmol) of methacrylic acid chloride and 0.4 ml (5.1 mmol) of pyridine were added. The temperature was then raised to 23° C., the mixture was stirred for 1 hour, and the completion of the reaction was confirmed by NMR. Then, the product was washed four times with 200 ml of water, and reprecipitated from methanol. The obtained liquid resin was removed by evaporation under reduced pressure to obtain the target polyisobutylene Q-4 terminated with a (meth)acryloyl group. The molecular weight of the obtained polymer Q-4 based on polystyrene was measured by size exclusion chromatography (SEC). Mw was 7,100, Mn was 5,900, and Mw/Mn was 1.20. Further, the Fn of the acryloyl groups introduced onto the end of the obtained acryloyl-terminated polyisobutylene Q-4 was 1.90.

To 100 parts by weight of the obtained acryloyl-terminated polyisobutylene Q-4 was added 2 parts of 2,2-diethoxyacetophenone (manufactured by Tokyo Chemical Industry Co., Ltd.) and thoroughly mixed. Then, this curable composition was poured into a metal frame (100 mm×100 mm×0.5 mm) made of SUS304, and irradiated with light (light amount 8,310 J/cm$^2$) for 5 minutes using a high-pressure mercury lamp (SHL-100UVQ-2, manufactured by Toshiba Lighting & Technology Corporation) to obtain a cured product. The gel fraction, residual chlorine concentration, and gas permeability of the obtained cured product were evaluated. The results are shown in Table 1.

TABLE 1

| Materials | | Example 5 | Example 6 | Example 7 | Example 8 | Comparative Example 4 |
|---|---|---|---|---|---|---|
| Polymer P-1 | | 100 | 100 | 100 | | |
| Polymer P-3 | | | | | 100 | |
| Polymer Q-4 | | | | | | 100 |
| Active energy ray polymerization initiator | Active energy ray polymerization initiator mixture [1] | 2.0 | 2.0 | 1.0 | 2.0 | |
| | 2,2-Diethoxyacetophenone | | | | | 2.0 |
| Functionalization rate (Fn) of polymer | | 1.93 | 1.93 | 1.93 | 1.92 | 1.90 |
| Light amount (J/cm$^2$) | | 2.6 | 1.0 | 2.6 | 2.6 | 8310 |
| Gel fraction (%) | | 99 | 99 | 99 | 96 | 99 |
| Residual chlorine concentration (ppm) | | 85 | 85 | 85 | 79 | 9821 |
| Gas permeability | Oxygen ($10^{-16}$ mol · m/m$^2$ · sec · Pa) | 4.4 | 4.6 | 4.7 | 4.4 | 4.5 |
| | Water vapor (g/m$^2$ · 24H) | 0.82 | 0.78 | 0.81 | 0.79 | 0.77 |

[1] Mixture of DAROCURE 1173 (2-hydroxy-2-methyl-1-phenyl-propan-1-one, manufactured by Ciba Japan K.K.) and IRGACURE 819 (bis(2,4,6-trimethylbenzoyl)-phenylphosphine oxide, manufactured by Ciba Japan K.K.) at a weight ratio of 2/1

It can be seen that the chlorine atom content in the compositions and cured products shown in Examples 5 to 8 is much lower than in Comparative Example 4. Further, it can also be seen that the time and the light amount required for curing in Examples 5 to 8 is less than in Comparative Example 4. Although the reasons for this are not clear, it is thought that atom structure near the terminal (meth)acryloyl group of the (meth)acryloyl-terminated polyisobutylene polymer used in the present invention has some sort of positive impact on photopolymerizability.

Therefore, a composition characterized by containing the (meth)acryloyl-terminated polyisobutylene polymer according to the present invention can provide an excellent material that has a low residual halogen concentration and that can be thoroughly cured even by an irradiation of a small amount of light.

INDUSTRIAL APPLICABILITY

Since the active energy ray-curable composition and the cured product according to the present invention have a low halogen atom content and can be rapidly cured by an irradiation of a small amount of light, they can be used in various applications, such as for a sealing material, a sealant, a coating material, a potting material, a fixed gasket, a formed-in-place gasket, an adhesive, a pressure-sensitive adhesive, a filler, a molding, a foam, a film, a casting material, an ink, an anti-vibration material, a damping material, a soundproofing material, a seismic isolation material and the like.

The invention claimed is:

1. A (meth)acryloyl-terminated polyisobutylene polymer represented by the following general formula (1):

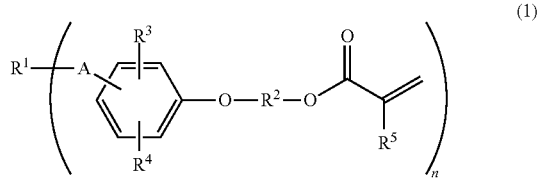

(1)

wherein $R^1$ represents a divalent group that is dicumyl chloride with two chlorine atoms being removed; A represents a polyisobutylene polymer; $R^2$ represents a divalent saturated hydrocarbon group having 2 to 6 carbon atoms and containing no hetero atoms; $R^3$ and $R^4$ each represent hydrogen, a monovalent hydrocarbon group having 1 to 20 carbon atoms, or an alkoxy group having 1 to 20 carbon atoms; $R^5$ represents hydrogen or a methyl group; and n is 2.

2. The (meth)acryloyl-terminated polyisobutylene polymer according to claim 1, wherein $R^2$ represents a divalent hydrocarbon group selected from the group consisting of —$CH_2CH_2$—, —$CH_2CH_2CH_2$—, —$CH_2CH_2CH_2CH_2$—, —$CH_2CH_2CH_2CH_2CH_2$—, and —$CH_2CH_2CH_2CH_2CH_2CH_2$—.

3. The (meth)acryloyl-terminated polyisobutylene polymer according to claim 1, wherein $R^2$ represents —$CH_2CH_2$—.

4. The (meth)acryloyl-terminated polyisobutylene polymer according to claim 1, wherein $R^3$ and $R^4$ represent hydrogen.

5. The (meth)acryloyl-terminated polyisobutylene polymer according to claim 1, wherein $R^5$ represents hydrogen.

6. The (meth)acryloyl-terminated polyisobutylene polymer according to claim 1, wherein the (meth)acryloyl-terminated polyisobutylene polymer (A) has a molecular weight of 200 to 500,000 in terms of number average molecular weight based on polystyrene measured by size exclusion chromatography (SEC), and a molecular weight distribution of 1.8 or less where the molecular weight distribution is represented by Mw/Mn, Mw/Mn is a ratio of the weight average molecular weight Mw to the number average molecular weight Mn.

* * * * *